US012568541B2

(12) United States Patent
Asterjadhi et al.

(10) Patent No.: US 12,568,541 B2
(45) Date of Patent: Mar. 3, 2026

(54) MULTIPLE ACCESS POINT (AP) ASSOCIATION

(71) Applicant: QUALCOMM Incorporated, San Diego, CA (US)

(72) Inventors: Alfred Asterjadhi, San Diego, CA (US); Sai Yiu Duncan Ho, San Diego, CA (US); George Cherian, San Diego, CA (US); Abhishek Pramod Patil, San Diego, CA (US); Abdel Karim Ajami, Lakeside, CA (US); Yanjun Sun, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 559 days.

(21) Appl. No.: 18/063,005

(22) Filed: Dec. 7, 2022

(65) Prior Publication Data

US 2024/0196457 A1 Jun. 13, 2024

(51) Int. Cl.
*H04W 76/15* (2018.01)
*H04W 76/18* (2018.01)

(52) U.S. Cl.
CPC ........... *H04W 76/15* (2018.02); *H04W 76/18* (2018.02)

(58) Field of Classification Search
CPC .............................. H04W 76/15; H04W 76/18
See application file for complete search history.

(56) References Cited

U.S. PATENT DOCUMENTS

| | | | | | |
|---|---|---|---|---|---|
| 12,035,384 B1 * | 7/2024 | Chu | ....................... | H04W 76/15 |
| 2021/0051574 A1 * | 2/2021 | Chu | ....................... | H04W 84/18 |

| | | | | | |
|---|---|---|---|---|---|
| 2022/0255849 A1 * | 8/2022 | Huang | ................... | H04W 84/12 |
| 2023/0119901 A1 * | 4/2023 | Viger | .................... | H04W 76/15 |
| | | | | | 370/329 |
| 2023/0141473 A1 * | 5/2023 | Sakai | ................... | H04L 63/0884 |
| | | | | | 726/4 |
| 2023/0143225 A1 * | 5/2023 | Sambhwani | .......... | H04W 76/14 |
| | | | | | 455/518 |
| 2023/0145990 A1 * | 5/2023 | Jeraj | ..................... | H04L 5/0062 |
| | | | | | 370/329 |
| 2023/0180121 A1 * | 6/2023 | Sheik | .................... | H04W 48/20 |
| | | | | | 370/329 |
| 2023/0180322 A1 * | 6/2023 | Sevindik | ................... | H04L 5/14 |
| | | | | | 370/329 |
| 2023/0217525 A1 * | 7/2023 | Kim | ..................... | H04W 76/15 |
| | | | | | 370/329 |

(Continued)

FOREIGN PATENT DOCUMENTS

| | | |
|---|---|---|
| WO | 2021011426 A1 | 1/2021 |
| WO | 2021011476 A1 | 1/2021 |
| WO | 2022015045 A1 | 1/2022 |

OTHER PUBLICATIONS

International Search Report and Written Opinion—PCT/US2023/078632—ISA/EPO—Mar. 1, 2024.

*Primary Examiner* — Ajay Cattungal

(74) *Attorney, Agent, or Firm* — ArentFox Schiff, LLP

(57) ABSTRACT

This disclosure provides methods, components, devices and systems for multiple access point (AP) association with a single station (STA) to provide a seamless transition (e.g., little to no service interruption during an active link transfer). Some aspects more specifically relate to a multi-link entity (MLE) and multiple AP members of the MLE, and their communications with the STA.

27 Claims, 12 Drawing Sheets

(56)                    References Cited

U.S. PATENT DOCUMENTS

| | | | |
|---|---|---|---|
| 2023/0217542 A1* | 7/2023 | Abdelmalek | H04W 76/20 |
| | | | 370/329 |
| 2023/0308984 A1* | 9/2023 | Butler | H04W 4/60 |
| 2023/0309164 A1* | 9/2023 | Xu | H04W 28/26 |
| 2024/0097922 A1* | 3/2024 | Dash | H04L 12/145 |
| 2024/0163739 A1* | 5/2024 | Purkayastha | H04W 76/15 |
| 2024/0251463 A1* | 7/2024 | Mundy | G06F 30/13 |

* cited by examiner

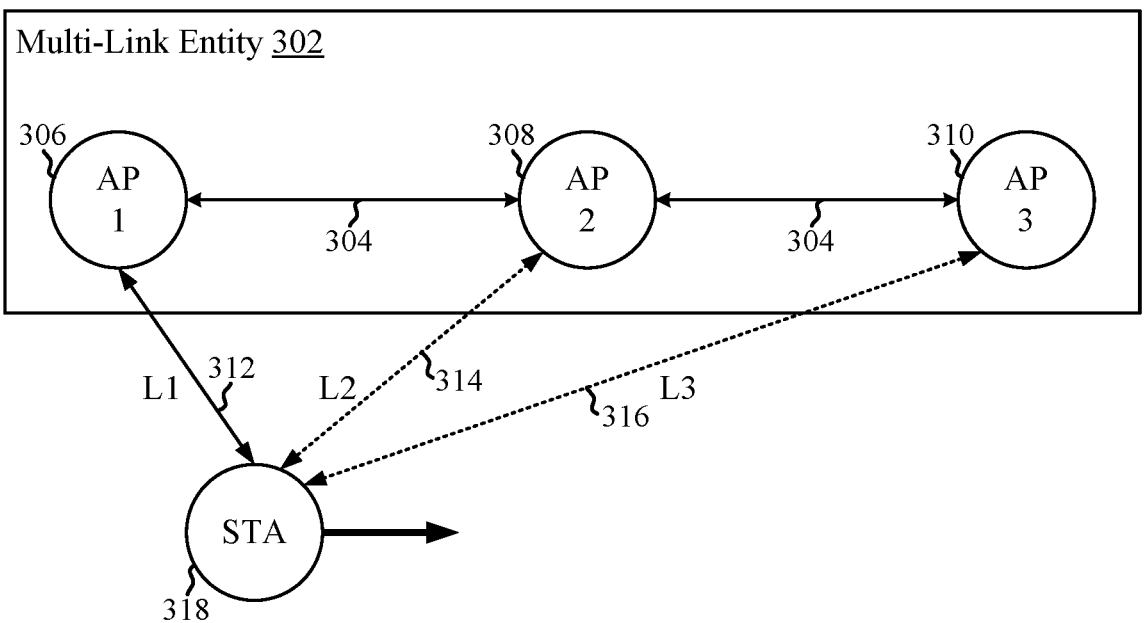
*Figure 3*

400

402

First AP

404

STA

Communication Parameters → 406

408

Calculate
Commnunciation
Metrics

410

Association between STA and one or more of First AP and MLE

412

Generate
Candidate AP
Set

500

MLE 505

502 — First AP

503 — Second AP

504 — STA

506

Association with STA and one or more of First AP and MLE

508

Monitor Traffic Between STA and First AP

510

Link Transfer Requested

512

ACK

513

ACK

514

Communication Param.

516

Response

518

ACK

600

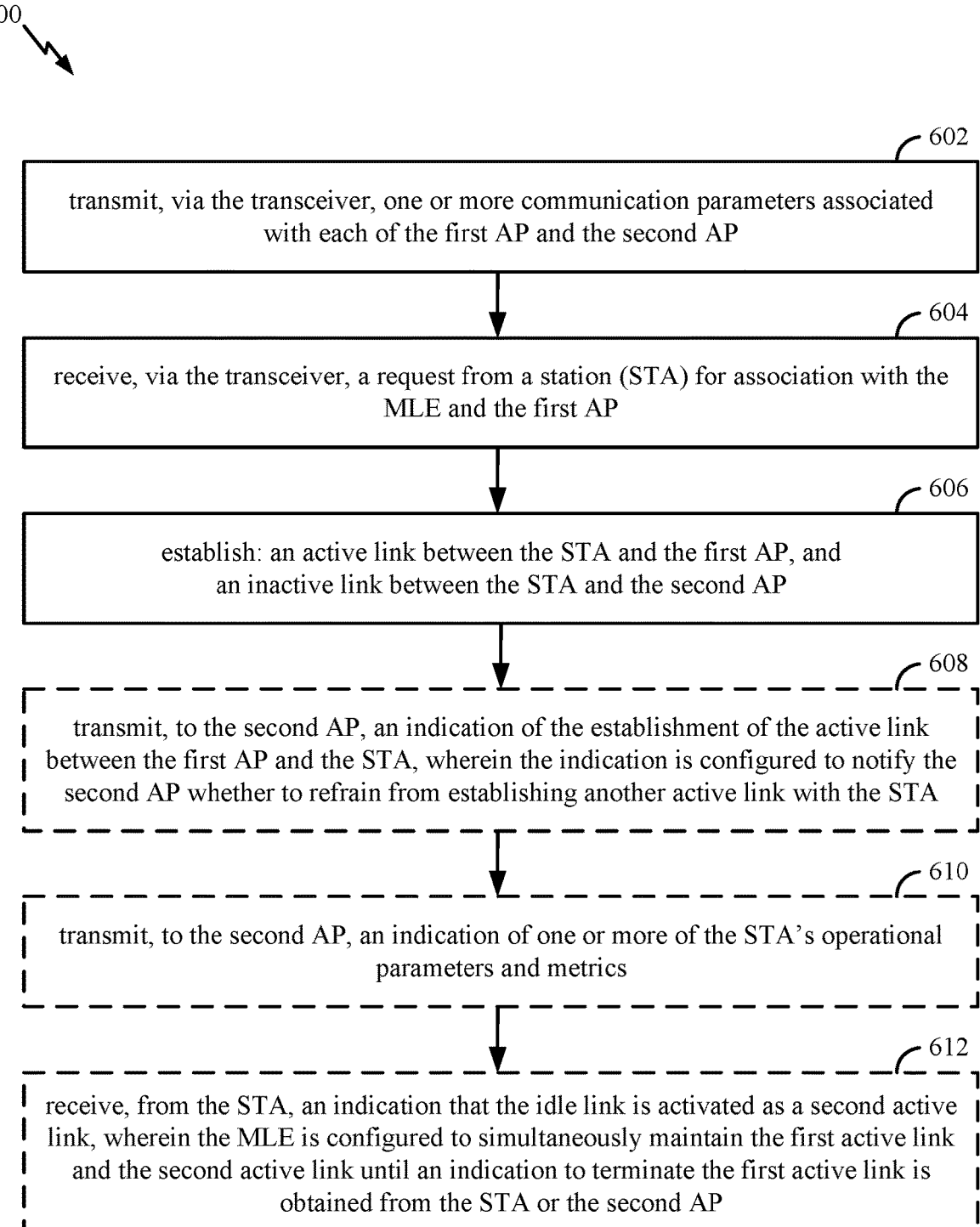

602 transmit, via the transceiver, one or more communication parameters associated with each of the first AP and the second AP

604 receive, via the transceiver, a request from a station (STA) for association with the MLE and the first AP

606 establish: an active link between the STA and the first AP, and an inactive link between the STA and the second AP

608 transmit, to the second AP, an indication of the establishment of the active link between the first AP and the STA, wherein the indication is configured to notify the second AP whether to refrain from establishing another active link with the STA

610 transmit, to the second AP, an indication of one or more of the STA's operational parameters and metrics

612 receive, from the STA, an indication that the idle link is activated as a second active link, wherein the MLE is configured to simultaneously maintain the first active link and the second active link until an indication to terminate the first active link is obtained from the STA or the second AP

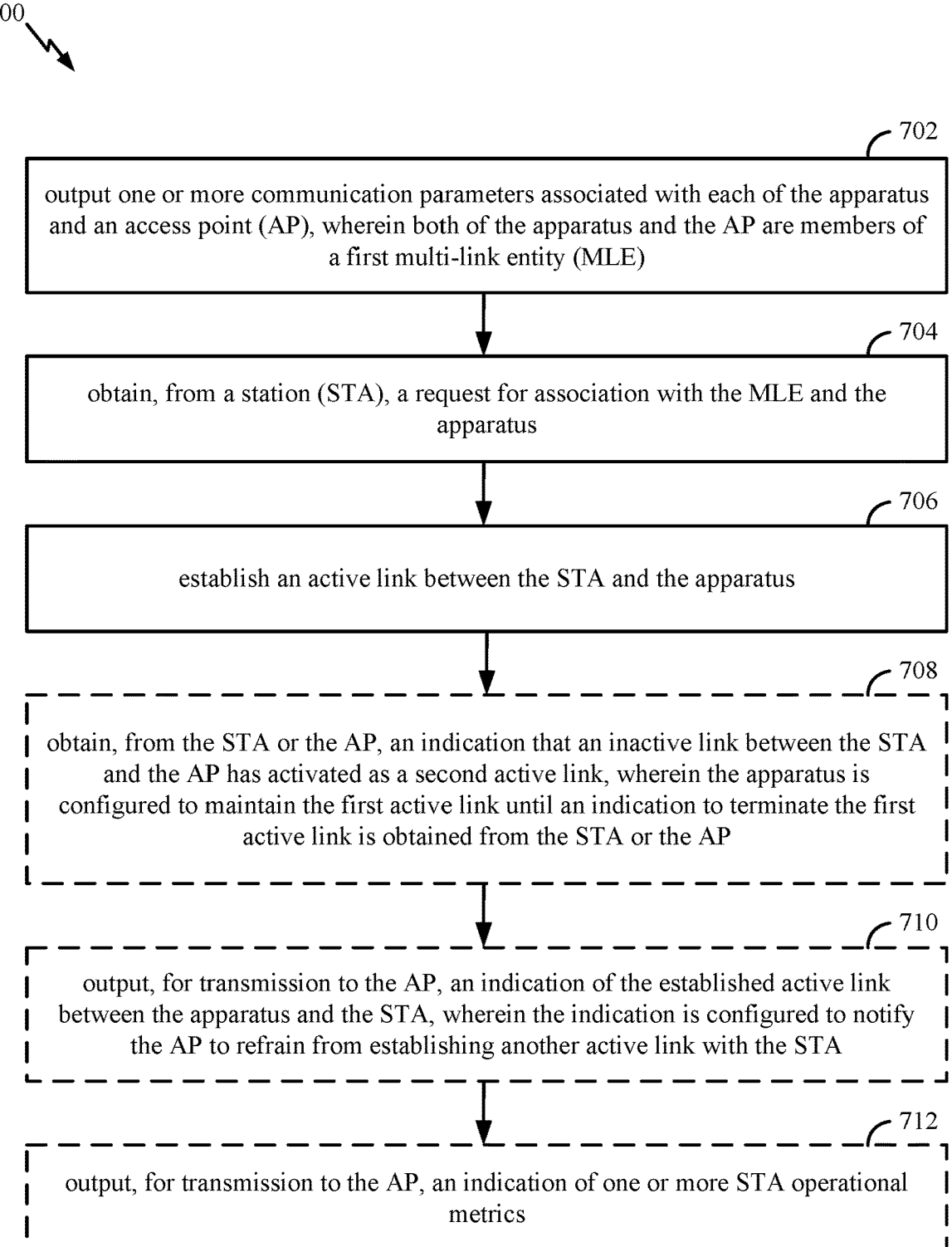

702 output one or more communication parameters associated with each of the apparatus and an access point (AP), wherein both of the apparatus and the AP are members of a first multi-link entity (MLE)

704 obtain, from a station (STA), a request for association with the MLE and the apparatus

706 establish an active link between the STA and the apparatus

708 obtain, from the STA or the AP, an indication that an inactive link between the STA and the AP has activated as a second active link, wherein the apparatus is configured to maintain the first active link until an indication to terminate the first active link is obtained from the STA or the AP

710 output, for transmission to the AP, an indication of the established active link between the apparatus and the STA, wherein the indication is configured to notify the AP to refrain from establishing another active link with the STA

712 output, for transmission to the AP, an indication of one or more STA operational metrics

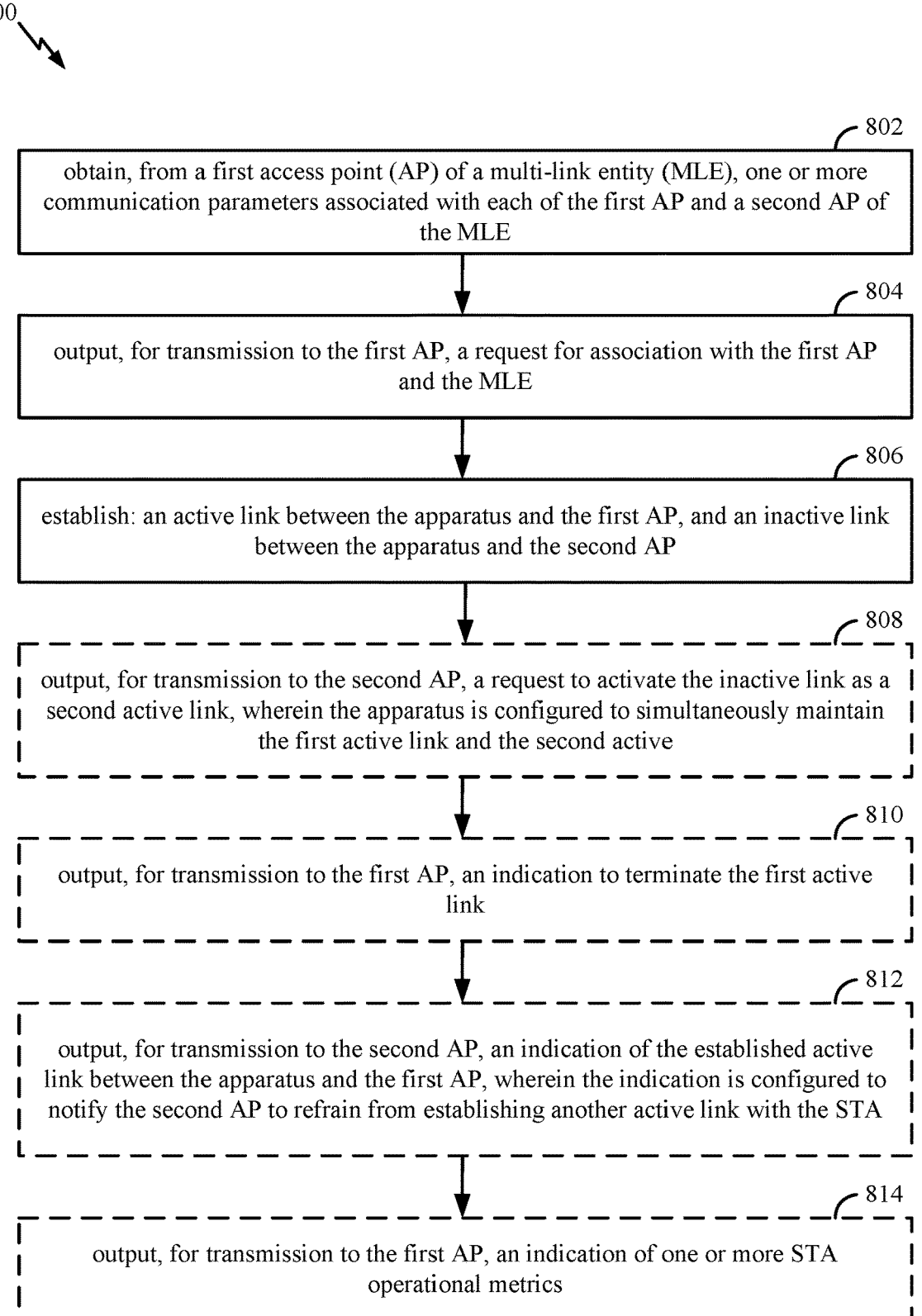

802 obtain, from a first access point (AP) of a multi-link entity (MLE), one or more communication parameters associated with each of the first AP and a second AP of the MLE

804 output, for transmission to the first AP, a request for association with the first AP and the MLE

806 establish: an active link between the apparatus and the first AP, and an inactive link between the apparatus and the second AP

808 output, for transmission to the second AP, a request to activate the inactive link as a second active link, wherein the apparatus is configured to simultaneously maintain the first active link and the second active

810 output, for transmission to the first AP, an indication to terminate the first active link

812 output, for transmission to the second AP, an indication of the established active link between the apparatus and the first AP, wherein the indication is configured to notify the second AP to refrain from establishing another active link with the STA

814 output, for transmission to the first AP, an indication of one or more STA operational metrics

*Figure 8*

MULTIPLE ACCESS POINT (AP) ASSOCIATION

TECHNICAL FIELD

This disclosure relates generally to wireless communication, and more specifically, to multiple access point (AP) association operations.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, a mobile STA may associate with an AP, and then perform authentication with the AP. In some cases, when an STA roams or moves to a new area, the STA disassociates with the current AP, then associates and performs authentication with a new AP that provides a stronger signal. Also, in at least some wireless networks, handover decisions (e.g., when to handover an STA to a new AP, and to which new AP) are typically made by the mobile station. However, the STA typically has incomplete information regarding the network and thus, handover decisions by the STA may result in inefficient use of network resources or other problems. Moreover, a brief service interruption may occur as an STA disassociates with a current AP and associates and authenticates with a new AP. Improved operation may be desirable, at least in some cases.

SUMMARY

The systems, methods and devices of this disclosure each have several innovative aspects, no single one of which is solely responsible for the desirable attributes disclosed herein.

Aspects are directed to a multi-link entity (MLE) being associated with a plurality of access points (APs) including a first AP and a second AP configured for wireless communication. In some examples, the MLE may include a transceiver, a memory comprising instructions, and one or more processors configured to execute the instructions. In some examples, the instructions may cause the MLE to transmit, via the transceiver, one or more communication parameters associated with each of the first AP and the second AP. In some examples, the instructions may cause the MLE to receive, via the transceiver, a request from a station (STA) for association with the MLE and the first AP. In some examples, the instructions may cause the MLE to establish: an active link between the STA and the first AP, and an inactive link between the STA and the second AP.

Aspects are directed to an apparatus configured for wireless communication. In some examples, the apparatus may include a memory comprising instructions, and one or more processors configured to execute the instructions. In some examples, the instructions may cause the apparatus to output one or more communication parameters associated with each of the apparatus and an access point (AP), wherein both of the apparatus and the AP are members of a first multi-link entity (MLE). In some examples, the instructions may cause the apparatus to obtain, from a station (STA), a request for association with the MLE and the apparatus. In some examples, the instructions may cause the apparatus to establish an active link between the STA and the apparatus.

Aspects are directed to an apparatus configured for wireless communication. The apparatus may include a memory comprising instructions, and one or more processors configured to execute the instructions. In some examples, the instructions may cause the apparatus to obtain, from a first access point (AP) of a multi-link entity (MLE), one or more communication parameters associated with each of the first AP and a second AP of the MLE. In some examples, the instructions may cause the apparatus to output, for transmission to the first AP, a request for association with the first AP and the MLE. In some examples, the instructions may cause the apparatus to establish: an active link between the apparatus and the first AP, and an inactive link between the apparatus and the second AP.

Aspects are directed to a method of wireless communication by a multi-link entity (MLE) being associated with a plurality of access points (APs) including a first AP and a second AP. In some examples, the method includes transmitting, via the transceiver, one or more communication parameters associated with each of the first AP and the second AP. In some examples, the method includes receiving, via the transceiver, a request from a station (STA) for association with the MLE and the first AP. In some examples, the method includes establishing: an active link between the STA and the first AP, and an inactive link between the STA and the second AP.

Aspects are directed to a method of wireless communication at an apparatus. In some examples, the method includes outputting one or more communication parameters associated with each of the apparatus and an access point (AP), wherein both of the apparatus and the AP are members of a first multi-link entity (MLE). In some examples, the method includes obtaining, from a station (STA), a request for association with the MLE and the apparatus. In some examples, the method includes establishing an active link between the STA and the apparatus.

Aspects are directed to a method of wireless communication at an apparatus. In some examples, the method includes obtaining, from a first access point (AP) of a multi-link entity (MLE), one or more communication parameters associated with each of the first AP and a second AP of the MLE. In some examples, the method includes outputting, for transmission to the first AP, a request for association with the first AP and the MLE. In some examples, the method includes establishing: an active link between the apparatus and the first AP, and an inactive link between the apparatus and the second AP.

Aspects are directed to an apparatus associated with a plurality of access points (APs) including a first AP and a second AP. In some examples, the apparatus includes mean for transmitting one or more communication parameters associated with each of the first AP and the second AP. In some examples, the apparatus includes means for receiving a request from a station (STA) for association with the MLE and the first AP. In some examples, the apparatus includes means or establishing: an active link between the STA and the first AP, and an inactive link between the STA and the second AP.

Aspects are directed to an apparatus. In some examples, the apparatus includes means for outputting one or more communication parameters associated with each of the apparatus and an access point (AP), wherein both of the apparatus and the AP are members of a first multi-link entity (MLE). In some examples, the apparatus includes means for obtaining, from a station (STA), a request for association with the MLE and the apparatus. In some examples, the apparatus includes means for establishing an active link between the STA and the apparatus.

Aspects are directed to a method of wireless communication at an apparatus. In some examples, the method includes obtaining, from a first access point (AP) of a multi-link entity (MLE), one or more communication parameters associated with each of the first AP and a second AP of the MLE. In some examples, the method includes outputting, for transmission to the first AP, a request for association with the first AP and the MLE. In some examples, the method includes establishing: an active link between the apparatus and the first AP, and an inactive link between the apparatus and the second AP.

Aspects are directed to a non-transitory computer-readable storage medium having instructions stored thereon, that when executed by a multi-link entity (MLE) being associated with a plurality of access points (APs) including a first AP and a second AP, cause the MLE to perform a method. In some examples, the method includes transmitting, via the transceiver, one or more communication parameters associated with each of the first AP and the second AP. In some examples, the method includes receiving, via the transceiver, a request from a station (STA) for association with the MLE and the first AP. In some examples, the method includes establishing: an active link between the STA and the first AP, and an inactive link between the STA and the second AP.

Aspects are directed to a non-transitory computer-readable storage medium having instructions stored thereon, that when executed by an apparatus, cause the apparatus to perform a method. In some examples, the method includes outputting one or more communication parameters associated with each of the apparatus and an access point (AP), wherein both of the apparatus and the AP are members of a first multi-link entity (MLE). In some examples, the method includes obtaining, from a station (STA), a request for association with the MLE and the apparatus. In some examples, the method includes establishing an active link between the STA and the apparatus.

Aspects are directed to non-transitory computer-readable storage medium having instructions stored thereon, that when executed by an apparatus, cause the apparatus to perform a method. In some examples, the method includes obtaining, from a first access point (AP) of a multi-link entity (MLE), one or more communication parameters associated with each of the first AP and a second AP of the MLE. In some examples, the method includes outputting, for transmission to the first AP, a request for association with the first AP and the MLE. In some examples, the method includes establishing: an active link between the apparatus and the first AP, and an inactive link between the apparatus and the second AP.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 3 shows an example network formed by a multi-link entity (MLE) containing multiple access points (APs) and a station (STA).

FIG. 6 shows a flowchart illustrating an example process performable by an MLE via a wireless AP that supports multi-AP association.

FIG. 7 shows a flowchart illustrating an example process performable by a wireless AP that supports multi-AP association.

FIG. 8 shows a flowchart illustrating an example process performable by a wireless STA that supports multi-AP association.

Like reference numbers and designations in the various drawings indicate like elements.

DETAILED DESCRIPTION

Figure 1:
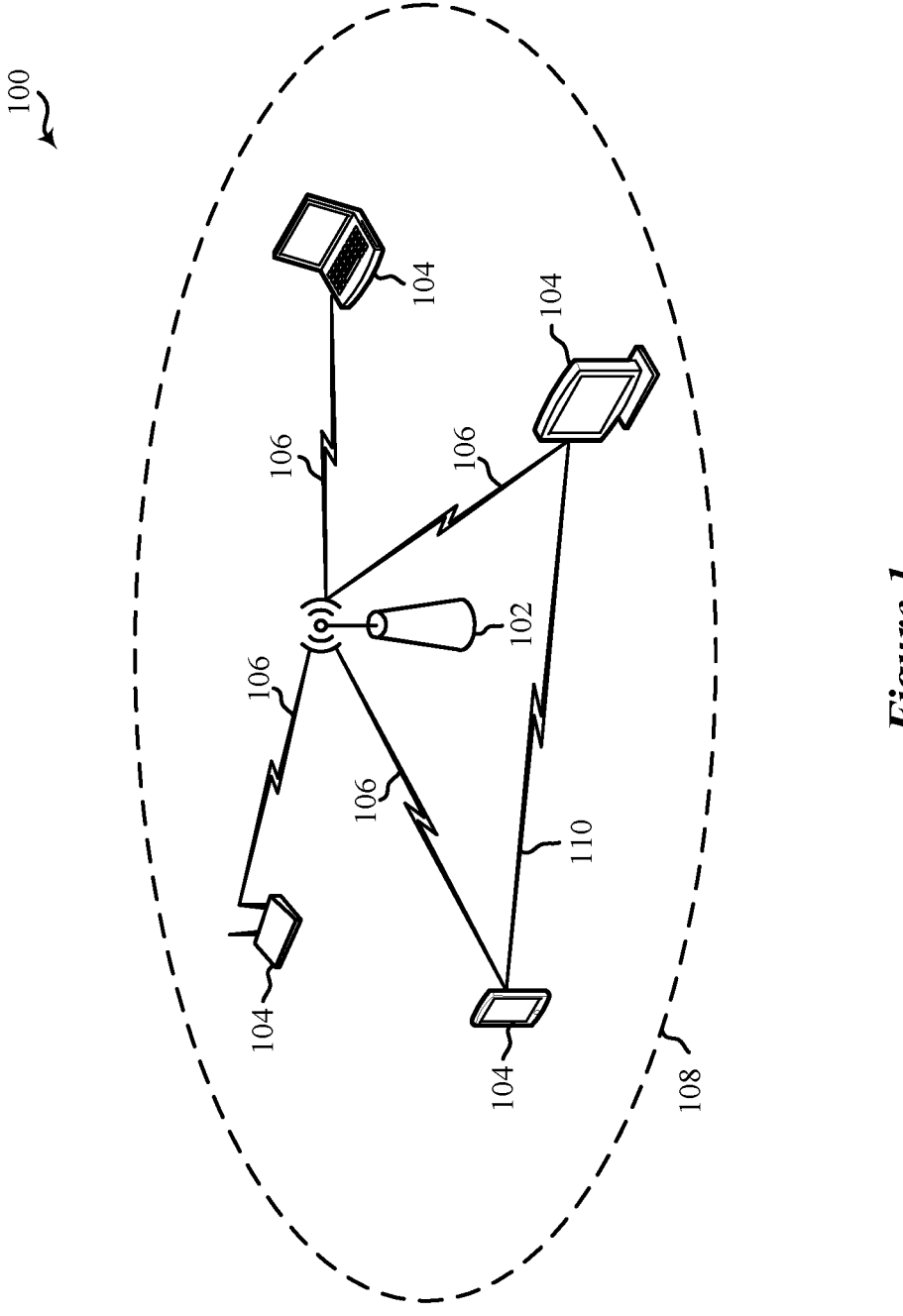
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3$^{rd}$ Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communication and more particularly to seamless communications between a station (STA) and multiple access points (APs). Typically, when moving from one AP to another, the STA has to re-associate with a new AP. That is, communication with a first AP is interrupted (e.g., service disruption), and all the state information and data associated with the STA and the first AP is lost. Thus, aspects are directed to methods and apparatus for transitioning to a new AP (e.g., a second AP) while maintaining an active communication link between the STA and the first AP. In other words, aspects are directed to transferring a data path to the new AP without interruption. In some examples, the multiple APs may be part of a logical multi-link entity (MLE). In some aspects, the multiple APs may be part of a logical multi-AP entity (MAE). In another example, one or more of the STA and the APs may be multi-link devices (MLDs). In some aspects, multiple MLD APs may be part of the logical multi-AP MLD.

Particular aspects of the subject matter described in this disclosure can be implemented to realize one or more of the following potential advantages. In some examples, one or more of the multiple APs may advertise communication parameters such as basic service set (BSS) parameters and/or MLD parameters associated with each of the multiple APs or a subset of the multiple APs. For example, a first AP of the multiple APs may periodically transmit communication parameters for each of the multiple APs. In some examples, the first AP may advertise parameters only for APs that are members of an MLE. It should be noted that while some examples are directed to one or more AP MLDs, the concepts and techniques described herein apply to non-MLD APs with equal force.

Because each AP advertises communication parameters for itself and other APs, an STA within range can gather information about the other APs. Thus, if the STA is mobile (or the AP to which the STA is associated is mobile) and it initially associates with a first AP, the STA may not need to re-associate with any of the other APs once it is within their range because it has associated with the first AP, and because it already has information of the other APs. This provides for a seamless transition for a mobile STA between multiple APs.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN network 100 also can include multiple APs 102, wherein the APs can be physically collocated (e.g., members of the same AP MLD) or physically not collocated (i.e., members of different AP MLDs). AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IOT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHZ or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHZ and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHZ or 6 GHz bands, each of which is divided into multiple 20 MHZ channels. As such, these PPDUs are transmitted over a physical channel having a minimum bandwidth of 20 MHZ, but larger channels can be formed through channel bonding. For example, PPDUs may be transmitted over physical channels having bandwidths of 40 MHz, 80 MHZ, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Figure 2:
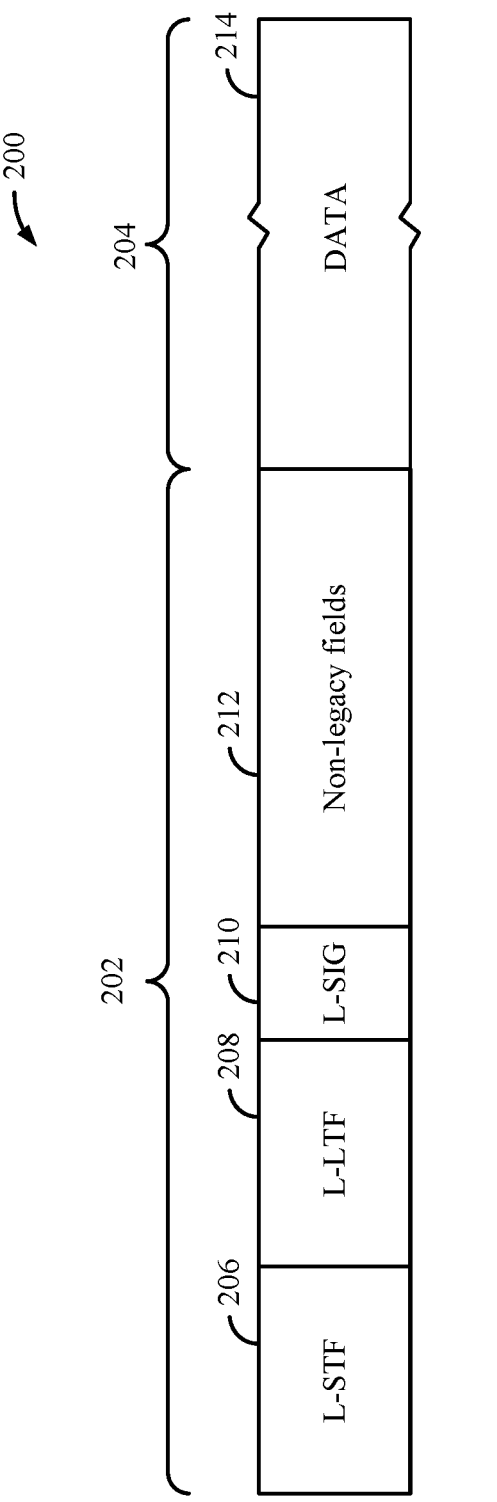
FIG. 2 shows an example protocol data unit (PDU) usable for communications between a wireless access point and one or more wireless stations.

FIG. 2 shows an example protocol data unit (PDU) 200 usable for wireless communication between a wireless AP 102 and one or more wireless STAs 104. For example, the PDU 200 can be configured as a physical layer PDU (PPDU). As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Retransmission protocols, such as hybrid automatic repeat request (HARQ), also may offer performance gains. A HARQ protocol may support various HARQ signaling between transmitting and receiving wireless communication devices as well as signaling between the PHY and MAC layers to improve the retransmission operations in a WLAN. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a WLAN may improve reliability of data communicated from a transmitting device to a receiving device. The HARQ protocol may support the establishment of a HARQ session between the two devices. Once a HARQ session is established, If a receiving device cannot properly decode (and cannot correct the errors) a first HARQ transmission received from the transmitting device, the receiving device may transmit a HARQ feedback message to the transmitting device (for example, a negative acknowledgement (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an ARQ protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

Some wireless communication devices (including both APs and STAs) are capable of multi-link operation (MLO). In some examples, MLO supports establishing multiple different communication links (such as a first link on the 2.4 GHz band, a second link on the 5 GHz band, and the third link on the 6 GHz band) between the STA and the AP. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs each configured to communicate on a respective communication link with a respective one of multiple STAs of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA is simultaneously transmitted across multiple communication links in parallel to maximize the utilization of available resources to achieve higher throughput. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported STA/MLO capability information (such as supported aggregation type or supported frequency bands, among other information). For example, an STA capability may be provided to an AP as a communication parameter. Such STA capabilities may include bandwidth(s) (BW) that the STA can communicate over, modulation and coding scheme(s) (MCS) that the STA is capable of using, an indication of a number of spatial streams (NSS) the STA supports, what 802.11 amendment the STA supports (e.g., HE, EHT, UHR), whether the STA supports capabilities such as: spatial reuse, target wake time and its variants (e.g., individual, broadcast, restricted, multi-link operation (col-located)), what multilink mode (e.g., multi link single radio (MLSR, enhanced e(MLSR), multi link multi radio (MLMR), enhanced MLMR, non-simultaneous transmit receive (NSTR)/STR) is supported by the STA, whether the STA supports TID-to-link mapping, and any other suitable information.

In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Some APs and STAs may be subject to power spectral density (PSD) limits. For example, some APs and STAs that operate in the 6 GHz frequency band may conform to a low power indoor (LPI) power class, which limits the transmit power of APs and STAs (in the 6 GHz band) to 5 decibel-milliwatts per megahertz (dBm/MHz) and −1 dBm/MHz, respectively. In other words, transmit power in the 6 GHz band is PSD-limited on a per-MHz basis.

As used herein, the term "distributed transmission" refers to PPDU transmissions on noncontiguous tones (or subcarriers) of a wireless channel (such as in accordance with a "distributed tone plan"). In contrast, the term "contiguous transmission" refers to PPDU transmissions on RUs that consist of contiguous tones, as defined by existing versions of the IEEE 802.11 standard (also referred to as a "non-distributed tone plan"). Distributed transmissions provide greater flexibility in medium utilization for power spectral density (PSD)-limited wireless channels. The low power indoor (LPI) power class limits the transmit power of APs and STAs in the 6 GHz band to 5 dBm/MHz and −1 dBm/MHz, respectively. By allowing a wireless communication device to distribute the tones allocated for the transmission of a PPDU across noncontiguous subcarrier indices of a wireless channel, distributed transmissions may increase the overall transmit power of the PPDU without exceeding the PSD limits of the wireless channel. For example, a distributed tone plan may reduce the total number of tones modulated by the device on any 1-MHz subchannel of the wireless channel. As a result, the wireless communication device may increase its per-tone transmit power without exceeding the PSD limits. Further, distributed transmissions by multiple wireless communication devices can be multiplexed onto a shared wireless channel thus increasing the transmit power of each device without sacrificing spectral efficiency. Such increases in transmit power can be combined with some MCSs to increase the range and throughput of wireless communications on PSD-limited wireless channels. Distributed transmissions also may improve the packet detection and channel estimation capabilities of the wireless communication devices.

Examples of Multiple AP Association

FIG. 3 shows a pictorial diagram of another example wireless communication network 300. According to some aspects, the wireless communication network 300 can be an example of a mesh network, an IoT network or a sensor network in accordance with one or more of the IEEE 802.11 family of wireless communication protocol standards (including the 802.11ah amendment). The wireless network 300 may include multiple APs (e.g., first AP 306, second AP 308, third AP 310) that are members of a multi-link entity (MLE) 302 in communication with a mobile STA 318. The multiple APs form a multi-link entity 302 and may communicate with each other via backhaul links 304. The APs and STA may be multi-link devices.

The STA 318 may communicate with the multiple APs via wireless communication links. As illustrated, the STA 318 may communicate with the first AP 306 via an active link 312 (L1), whereas the STA 318 may also establish one or more inactive links with other APs (e.g., a first inactive link 314 with the second AP 308 and a second inactive link 316 with the third AP 310). In some examples, the wireless communication links include Bluetooth links or other PAN or short-range communication links.

In some examples, the STA 318 and/or one or more of the multiple APs may also be configured for wireless communication with other networks such as with a Wi-Fi WLAN or a wireless (for example, cellular) wide area network (WWAN), which may, in turn, provide access to external networks including the Internet. For example, the first AP 306 may associate and communicate with an external node via a WLAN network, which also may serve the STA 318. In some examples, one or more of the multiple APs may be configured as a network gateway, for example, an IoT gateway. In such a manner, an AP may serve as an edge network bridge providing a Wi-Fi core backhaul for the MLE 302. In some examples, an AP can analyze, preprocess and aggregate data received from the STA 318, and transmit the data to other APs via a backhaul link 304 or external networks via a Wi-Fi link. Each AP may communicate with an STA using the same and/or different channels relative to another AP.

In certain aspects, the backhaul links 304 may be used by the APs to facilitate transmission of data links from one AP to another without service interruption. In one example, a "light" backhaul process may be used where the STA 318 is configured to perform association with multiple APs. Here, a single AP (e.g., the first AP 306) may be designated as a serving AP. The serving AP may be configured to maintain a block ACK (BA) scoreboard and operational context (e.g., communication parameters associated with the STA 318 and the first AP 306). Thus, the STA 318 may associate (e.g., establish an active communication link) with the first AP 306, and the first AP 306 may operate as a serving AP. A mobile STA 318 may move to a location where signaling from the second AP 308 is higher quality relative to the signaling of the first AP 306 (e.g., the receive signal strength of packets sent by the second AP is higher compared to the receive signal strength of packets sent by the first AP). It should be noted that in some examples, one or more APs may be mobile. Thus, a mobile AP may also affect the strength of AP signaling from the perspective of an STA.

When the STA 318 senses that signaling from a second AP 308 is stronger than the first AP 306, or if the STA 318 anticipates that the second AP 308 will provide higher quality signaling based on its location and movement of the STA 318, the first AP 306 may transfer the context and BA scoreboard to the second AP 308 and the second AP 308 may become the serving AP. In this manner, active links may be switched back and forth quickly and without service disruption.

In some examples, a "heavy" backhaul process may be used. In this example, multiple APs may serve a single STA 318. For example, the first AP 306 and the second AP 308 may both serve the STA 318 and both APs may maintain their own local BA scoreboard associated with communications between the STA 318 and the respective AP. Because multiple APs serve the STA 318, the STA 318 may transmit an uplink PPDU to any of the serving APs, and either of the APs may transmit downlink PPDUs to the STA on any available link.

To facilitate scanning and discovery by the STA 318, one or more of the multiple APs may advertise communication parameters such as basic service set (BSS) parameters and/or MLD parameters associated with each of the multiple APs or a subset of the multiple APs. For example, the first AP 306 of the multiple APs may periodically broadcast communication parameters of each of the multiple APs. In some examples, the first AP 306 may advertise parameters only for APs that are members of the MLE 302, or may include APs that are outside of the MLE 302 but neighbor the first AP 306. In some examples, the first AP 306 may advertise the parameters via a management frame, such as for example a beacon frame, or a probe response frame.

APs that are members of an MLE (e.g., MLE 302) may advertise communication parameters in a reduced neighbor report (RNR) information element (IE) and/or a multi-link IE, or a neighbor report element. A co-located AP subfield setting in a BSS parameters field may indicate an APs' co-location with other APs (e.g., indicate that the AP is part of an MLE). The STA 318 may expect that member APs (e.g., first AP 306, second AP 308, and third AP 310) are neighbors of the reporting AP. While the MLE 302 may include multiple APs as members, any given member AP may advertise all or a subset of the multiple APs as candidate APs.

For example, an RNR IE may be part of a beacon or probe response frame that is transmitted by an AP. The RNR IE may include one or more neighbor AP information fields, each of which containing, among other information, one or more TBTT Information fields, that an AP may use to inform the STA of information regarding one or more neighbor APs, including whether one of more of these APs are part of an MLE, and whether one or more of these APs are part of the same MLE as the reporting AP. In one example, the AP may include a BSS parameters subfield and/or an MLD Parameters field in each TBTT Information fields to indicate whether the AP or a neighboring AP is a member of an MLE. In another example, an AP may use an RNR IE to indicate that multiple APs are members of an MLE. Here, the reporting AP may set its own service set identifier (SSID) in the RNR IE, then set the same SSID in BSS parameters to 0 to indicate that another AP is part of the same service set (e.g., member of the same MLE). In another example, a first AP may transmit an RNR IE configured to identify a second AP. In this example, an AP MLD ID field that identifies the second AP may be set to "0" or "1" to indicate whether the second AP is part of the same MLE as the first AP. In another example, a first AP may transmit a multi-link element as part of a beacon/probe transmission. Here, the first AP may use one or more STA profile sub-elements to identify other APs that are part of the same MLE as the first AP. There may be additional signaling to indicate that a reported AP is not collocated with the first AP, but is a member of the same MLE and has a same SSID.

Because each AP may advertise communication parameters for itself and other APs, an STA within range of one AP can gather information about the other APs that may be out of range. Thus, if the STA's 318 location is changing and it initially associates with the first AP 306, the STA 318 may not need to re-associate with any of the other APs once it is within their range because it has associated with the first AP, and because it already has information of all other member APs or a subset of the member APs.

The communication parameters may include information such as transmit power limitations (e.g., maximum transmit power, minimum transmit power, current transmit power, etc.) of each AP, link identifiers associated with the APs affiliated with the AP MLDs, a bandwidth of BSS for each AP, analog-to-digital converter (ADC) parameters (e.g., speed, resolution, accuracy, etc.) of ADCs for each AP, backoff counters and enhanced distributed medium access (EDCA) parameter sets associated with each AP, and any other suitable information. Thus, the STA 318 may scan and discover one or more beacon frames transmitted from one or more APs of the multiple APs and determine which link is best (e.g., which link has a relatively higher quality). If the beacon transmitted by the first AP 306 has the highest quality signal, the STA 318 may associate with the first AP 306, but may continue to listen to other APs as it moves to determine if another link becomes a higher quality link.

In certain aspects, the STA 318 may associate with both of the first AP 306, and the MLE 302 via the first AP 306. In other words, the STA 318 may establish an active link 312 with the first AP 306, and inactive links 314/316 with one or more other APs of the MLE 302. An inactive link is a link with no active communication between an AP and an STA, but is a link that may become activated. In some examples, the STA 318 may generate a candidate AP set (e.g., a list) based on information collected from the BSS/MLD parameters. Alternatively, or in addition, the STA 318 may also collect information for generating the candidate AP set based on one or more of: scanning for other APs and determining which APs are within range, measuring communication metrics of the other APs, and gathering AP communication parameters from individual APs. Some APs may utilize communication parameters that may not work with the STA's 318 communication needs. For example, the STA 318 may require a certain quality of service that an AP cannot provide, or the AP may communicate over a frequency band that the STA cannot use. In such a case, the STA 318 may not add the AP to the candidate AP set.

In some examples, the candidate AP set may include information measured and associated with one or more of the multiple APs, such as a signal-to-noise ratio (SNR) and/or a received signal strength indicator (RSSI) of signals (e.g., beacons) received from each AP, the communication parameters for each AP, and any other suitable information. The STA may then determine which AP is best for its communication needs (e.g., based on its service agreement, quality of service (QOS), capabilities, etc.). Accordingly, the STA may receive communication parameters via beacon, collect communication parameters and measured metrics associated with one or more of the multiple APs, and filter its candidate AP set based on the metrics and parameters.

Figure 4:
FIG. 4 shows a call flow diagram illustrating communications between multiple wireless APs and a wireless STA.

FIG. 4 is a call-flow diagram illustrating example communications between multiple APs (e.g., the APs of FIG. 3) including a first AP 402, and an STA 404 (e.g., STA 318 of FIG. 3). In some examples, the multiple APs may be members of an MLE (e.g., MLE 302).

At a first communication 406, the first AP 402 may broadcast a beacon or probe signal configured to advertise communication parameters for the first AP 402 and one or more other APs of the multiple APs. The STA 318 may also receive other beacon or probe signals transmitted by other APs.

The STA 404 may receive the advertised communication parameters and, at a first process 408, the STA 404 may calculate one or more communication metrics associated with each beacon or probe signal received from the multiple APs. For example, the STA may measure communication metrics such as an SNR and/or an RSSI of each signal broadcast from the APs to determine which AP has the highest quality signal. Based on the advertised communication parameters and the calculated communication metrics, the STA 404 may determine a suitable AP for association.

In the illustrated example, the STA 404 determines that of the multiple APs, the first AP 402 is the optimal candidate for association. Thus, at a second process 410, the STA 404 associates with the first AP 402, and in some examples, the MLE that the first AP 402 is a member of. The STA 404 and the first AP 402 may establish an active link for wireless communication. In an example where the multiple APs are part of an MLE, the STA 404 may also associate with the MLE, and establish one or more inactive links with other AP members of the MLE. The term "active link" refers to a link over which an STA and AP actively communicate.

The first AP 402, being the AP associated with the STA 404, may be configured to maintain status information of the STA 404. For example, the associated AP may maintain information regarding buffer unit (BU) availability for the STA 404, block ACK scoreboard states, buffer statuses, current schedules (e.g., uplink/downlink schedules), and any other suitable information. If the STA 404 also associates with the MLE, then one or more inactive links may be established between the STA and other APs (e.g., selected from the AP candidate set). The other APs may not maintain the current status information that the associated AP maintains, but the other APs may collect information (e.g., from the first AP 402 via backhaul or over the air signaling) information regarding the STA's 404 communication capabilities, association status with the MLE, the STA's credentials, etc.

At a third process 412, the STA 404 may generate a candidate AP set containing the communication parameters and measured metrics associated with each AP. If the STA 404 is mobile, it may continue to scan the air interface for beacon/probe signaling or other frames sent by the other APs and continue to calculate communication metrics associated with the signaling to determine if another AP would be more suitable for communication. For example, if the STA 404 moves closer to a second AP and further from the first AP 402, either the STA 404 or the first AP 402 may trigger a handover.

Figure 5:
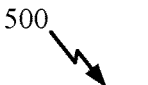
FIG. 5 shows a call flow diagram illustrating communications between multiple wireless APs and a wireless STA.

FIG. 5 is a call-flow diagram illustrating an example handover procedure, where an STA 504 transfers communication via an active link between the STA 504 and a first AP 502 to an active link with the second AP 503. The first AP 502 and the second AP 503 may be members of an MLE 505.

Initially, the STA 504 may be at a first location where it receives communication parameters from one or more of the first AP 502 and the second AP 503 (e.g., as illustrated in the first communication 406 of FIG. 4). The STA 504 may then calculate communication metrics for the signaling it received carrying the communication parameters (e.g., as illustrated in the first process 408 of FIG. 4).

At a first process 506, the STA 504 may associate and establish an active link with the first AP 502 (e.g., as illustrated in the second process 410 of FIG. 4). The STA 504 may also associate with the corresponding MLE 505 to establish an inactive link with the second AP 503 and any other member APs of the MLE 505.

As discussed, a transfer event (e.g., link transfer event) is a process that may be triggered when a requisite of interest of the STA 504 stops being satisfied by a first active link (e.g., between the STA 504 and an AP MLD) but can be satisfied by another link (e.g., between the STA 504 and another AP or AP MLD) that is currently inactive. In some examples, a requisite of interest includes a communication metric such as an SNR, an RSSI, or any other suitable quality/communication threshold(s) of the STA 504.

At a second process 508, one or more of the first AP 502, the second AP 503, and the STA 504 may detect a transfer event by monitoring traffic over the active link established between the STA 504 and the first AP 502. For example, the first AP 502 may maintain a log that contains an indication of recent and/or current uplink signal quality (e.g., SNR, RSSI, etc.) over the active link. The first AP 502 may share the log with the second AP 503 so that the second AP 503 can compare the log entries with its own quality measurements of STA 504 signals over the active link. In some examples, all APs that can sense uplink STA 504 signals over the active link may maintain a log of the signal quality. The APs may provide their logs other APs via a backhaul link or via measurement reports shared in the same link provided that the APs are within range with each other. If an AP (e.g., second AP 503) other than the first AP 502 (e.g., which holds the only active link with the STA 504) or the first AP 502 determines that the second AP 503 can receive higher quality STA 504 signaling relative to the first AP 502, then the determining AP may initiate a link transfer process to make the inactive link of the determining AP into an active link with the STA 504.

In one example, the second AP 503 may monitor traffic in the active link used for communications between the first AP 502 and the STA 504. The second AP 503 may sense a downlink frame transmitted by the first AP 502 to the STA 504, and the second AP 503 may determine a duration of the transmit opportunity (TXOP) during which the downlink frame is sent. The second AP 503 may then wait for a response from the STA 504. The second AP 503 may estimate the SINR/RSSI of the response frame from the STA 504. The second AP 503 may then transmit an indication of the estimated SINR/RSSI to the first AP 502, and/or receive, from the first AP 502, an SINR/RSSI of the response frame so that the second AP 503 can compare the two values to determine if the active link is the higher quality link. The first AP 502 may provide its estimated SINR/RSSI to the second AP 503 via a backhaul link or in a subsequent frame transmitted within the TXOP. At the end of the TXOP, the second AP 503 may detect a transfer event (e.g., the STA 504 signal received by the second AP 503 is of higher quality than the STA 504 signal as received by the first AP 502).

In another example, the STA 504 may passively monitor frames in the active and inactive links(s) noting that these links may be in the same or different frequency channels and/or bands. The STA 504 may estimate RSSI of beacons and other frames received from other APs (e.g., the second AP 503) of the MLE 505. To normalize RSSI estimation at the STA 504, the APs may advertise the actual transmit power of the frames they transmit or the member APs of the MLE 505 may all transmit using a same transmit power known by the STA 504. In another example, the STA 504 may actively probe APs of the MLE 505 (e.g., with a trigger frame or in a TDMA fashion). Each AP may respond to the probe with a frame containing an estimated RSSI of the STA's probe. Thus, the STA 504 may detect a link transfer event based on passive and/or active monitoring of link quality.

At a first communication 510, the STA 504 may transmit a request for active link transfer to the first AP 502. The request may indicate that the STA 504 is requesting an active link transfer to the second AP 503. At a second communication 512, the first AP 502 may transmit an ACK to the STA 504 in response to the first communication 510. In some examples, the first communication 510 may be broadcast by the STA 504, and ACK'd by all listening APs. Here, the second AP 503 may transmit an ACK to the STA 504 in a third communication 513. Broadcasting the request may reduce signaling delays because the second AP 503 (e.g., the AP to which the STA 504 is requesting to transfer) is put on notice of the transfer.

At a fourth communication 514, the first AP 502 may provide the second AP 503 with any communication parameters and management information related to the communications between the first AP 502 and the STA 504. For example, the first AP 502 may provide the second AP 503 with BA scoreboards, TID2link maps, negotiated schedules, and any other suitable operating parameters via a backhaul link. In some examples, the STA 504 may provide the communication parameters and management information to the second AP 503 in the broadcasted link transfer request of the first communication 510. Note that at this time the active link between the first AP 502 and the STA 504 is maintained to prevent interruption in service.

At a fifth communication 516, the second AP 503 may transmit a response to the STA 504 via a new active link. The active link between the first AP 502 and the STA 504 may still be maintained while the new active link between the second AP 503 and the STA 504 established and used for communication. At a sixth communication 518, the STA 504 may transmit an ACK to the second AP 503 in response to the fifth communication 516. At this point, the active link between the STA 504 and the first AP 502 may be dropped.

FIG. 6 shows a flowchart illustrating an example process 600 performable by an MLE having a member AP that supports multiple AP association according to some aspects of the present disclosure. The operations of the process 600 may be implemented by an MLE via a wireless AP or its components as described herein. For example, the process 600 may be performed by a wireless communication device, such as the wireless communication device 900 described with reference to FIG. 9, operating as or within a wireless AP. In some examples, the process 600 may be performed by a wireless AP such as one of the APs 102 described with reference to FIG. 1, and APs 306/308/310 of FIG. 3.

In some examples, in block 602, the wireless AP may transmit, via the transceiver, one or more communication parameters associated with each of the first AP and the second AP. For example, as illustrated in the first communication 406 of FIG. 4. In some examples, the first AP is physically separated from the second AP. In some examples, the one or more communication parameters are outputted for transmission via information signaling comprising one or more of a reduced neighbor report (RNR) IE, a neighbor report IE, a multi-link IE, and a multi-AP IE. In some examples, the information signaling is outputted for transmission via a management frame, and wherein the management frame is one of a beacon frame, a probe response frame, association response, FILS discovery frame, basic service set (BSS) transition management, fast BSS transition frame, and a link reconfiguration frame. In some examples, the one or more communication parameters comprise at least one of: a bandwidth of one or more of the first AP and the second AP, a transmit power limitation of one or more of the first AP and the second AP, an operating channel of one or more of the first AP and the second AP, a link identifier of one or more of the first AP and the second AP, and an indication that the first AP and the second AP are physically separated members of the MLE.

In block 604, the wireless AP may receive, via the transceiver, a request from a station (STA) for association with the MLE and the first AP. For example, as illustrated in the second process 410 of FIG. 4 and/or one or more of the first process 506 and the first communication 510 of FIG. 5.

In block 606, the wireless AP may establish: an active link between the STA and the first AP, and an inactive link between the STA and the second AP. For example, as illustrated in the second process 410 of FIG. 4 and/or the first process 506 of FIG. 5.

In optional block 608, the wireless AP may transmit, to the second AP, an indication of the establishment of the active link between the first AP and the STA, wherein the indication is configured to notify the second AP whether to refrain from establishing another active link with the STA. In this example, the first AP may provide the second AP with the indication via a backhaul link or a broadcast message.

In optional block 610, the wireless AP may transmit, to the second AP, an indication of one or more of the STA's operational parameters and metrics. For example, as illustrated in the fourth communication 514 of FIG. 5. Here, the one or more STA operational parameters and metrics may include one or more of a primary channel used by the STA, communication capabilities of the STA, an operational status of the STA, an association status between the STA and the MLE, and at least one STA credential.

At optional block 612, the wireless AP may receive, from the STA, an indication that the inactive link is activated as a second active link, wherein the MLE is configured to simultaneously maintain the first active link and the second active link until an indication to terminate the first active link is obtained from the STA or the second AP. In some examples, the sixth communication 518 of FIG. 5 may be the indication to terminate the first active link.

FIG. 7 shows a flowchart illustrating an example process 700 performable at a wireless AP that supports multiple AP association according to some aspects of the present disclosure. The operations of the process 700 may be implemented by a wireless AP or its components as described herein. For example, the process 700 may be performed by a wireless communication device, such as the wireless communication device 1000 described with reference to FIG. 10, operating as or within a wireless AP. In some examples, the process 700 may be performed by a wireless AP such as one of the APs 102 described with reference to FIG. 1, and APs 306/308/310 of FIG. 3.

In some examples, in block 702, the wireless AP may output one or more communication parameters associated with each of the apparatus and an access point (AP), wherein both of the apparatus and the AP are members of a first multi-link entity (MLE). For example, as illustrated in the first communication 406 of FIG. 4.

In block 704, the wireless AP may obtain, from a station (STA), a request for association with the MLE and the apparatus. For example, as illustrated in the second process 410 of FIG. 4 and/or the first process 506 of FIG. 5.

In block 706, the wireless AP may establish an active link between the STA and the apparatus. For example, as illustrated in the second process 410 of FIG. 4 and/or the first process 506 of FIG. 5.

In certain aspects, the one or more communication parameters comprise at least one of: a bandwidth of the apparatus and the AP, a transmit power limitation of the apparatus and the AP, an operating channel of the apparatus and the AP, a link identifier of the apparatus and the AP, or an indication that the apparatus and the AP are physically separated members of the MLE.

In certain aspects, the one or more communication parameters are outputted for transmission via information signaling comprising one or more of a reduced neighbor report (RNR) information element (IE), a neighbor report IE, a multi-link IE, and a multi-AP IE.

In certain aspects, the information signaling is outputted for transmission via a management frame, and wherein the management frame is one of a beacon frame, a probe response frame, an association response frame, a basic service set (BSS) transition management frame, and a link reconfiguration frame.

In certain aspects, the STA operational metrics include one or more of a primary channel used by the STA, communication capabilities of the STA, an operational status of the STA, an association status between the STA and the apparatus, and at least one STA credential.

In optional block 708, the wireless AP may obtain, from the STA or the AP, an indication that an inactive link between the STA and the AP has activated as a second active link, wherein the apparatus is configured to maintain the first active link until an indication to terminate the first active link is obtained from the STA or the AP. Here, the STA or the AP may notify the apparatus that an inactive link has been activated, resulting in two simultaneously active links, with each link corresponding to a different AP.

In optional block 710, the wireless AP may output, for transmission to the AP, an indication of the established active link between the apparatus and the STA, wherein the indication is configured to notify the AP to refrain from establishing another active link with the STA. For example, as illustrated in the second process of FIG. 4 and/or the first process 506 of FIG. 5.

In optional block 712, the wireless AP may output, for transmission to the AP, an indication of one or more STA operational metrics. For example, the wireless AP may output the one or more STA metrics during the second process 410 of FIG. 4 and/or the first process 506 and/or second process 508 of FIG. 5.

FIG. 8 shows a flowchart illustrating an example process 800 performable at a wireless STA that supports multiple AP association according to some aspects of the present disclosure. The operations of the process 800 may be implemented by a wireless STA or its components as described herein. For example, the process 800 may be performed by a wireless communication device, such as the wireless communication device 1100 described with reference to FIG. 11, operating as or within a wireless STA. In some examples, the process 800 may be performed by a wireless STA such as one of the STAs 104 described with reference to FIG. 1, or the STA 318 of FIG. 3.

In some examples, in block 802, the wireless STA may obtain, from a first access point (AP) of a multi-link entity (MLE), one or more communication parameters associated with each of the first AP and a second AP of the MLE.

In some examples, in block 804, the wireless STA may output, for transmission to the first AP, a request for association with the first AP and the MLE.

In some examples, in block 806, the wireless STA may establish: an active link between the apparatus and the first AP, and an inactive link between the apparatus and the second AP.

In some examples, in block 808, the wireless STA may output, for transmission to the second AP, a request to activate the inactive link as a second active link, wherein the apparatus is configured to simultaneously maintain the first active link and the second active.

In some examples, in block 810, the wireless STA may output, for transmission to the first AP, an indication to terminate the first active link.

In some examples, in block 812, the wireless STA may output, for transmission to the second AP, an indication of the established active link between the apparatus and the first AP, wherein the indication is configured to notify the second AP to refrain from establishing another active link with the STA.

In some examples, in block 814, the wireless STA may output, for transmission to the first AP, an indication of one or more STA operational metrics.

In certain aspects, the one or more communication parameters comprise at least one of: a bandwidth of the first AP and the second AP, a transmit power limitation of the first AP and the second AP, an operating channel of the first AP and the second AP, a link identifier of the first AP and the second AP, or an indication that the first AP and the second AP are physically separated members of the MLE.

In certain aspects, the one or more communication parameters are obtained via information signaling comprising one or more of a reduced neighbor report (RNR) information element (IE), a neighbor report IE, a multi-link IE, and a multi-AP IE.

In certain aspects, the information signaling is obtained via a management frame, and wherein the management frame is one of a beacon frame, a probe response frame, an association response frame, a basic service set (BSS) transition management frame, and a link reconfiguration frame.

In certain aspects, the STA operational metrics include one or more of a primary channel used by the apparatus, communication capabilities of the apparatus, an operational status of the apparatus, an association status between the apparatus and the MLE, and at least one credential of the apparatus.

Figure 9:
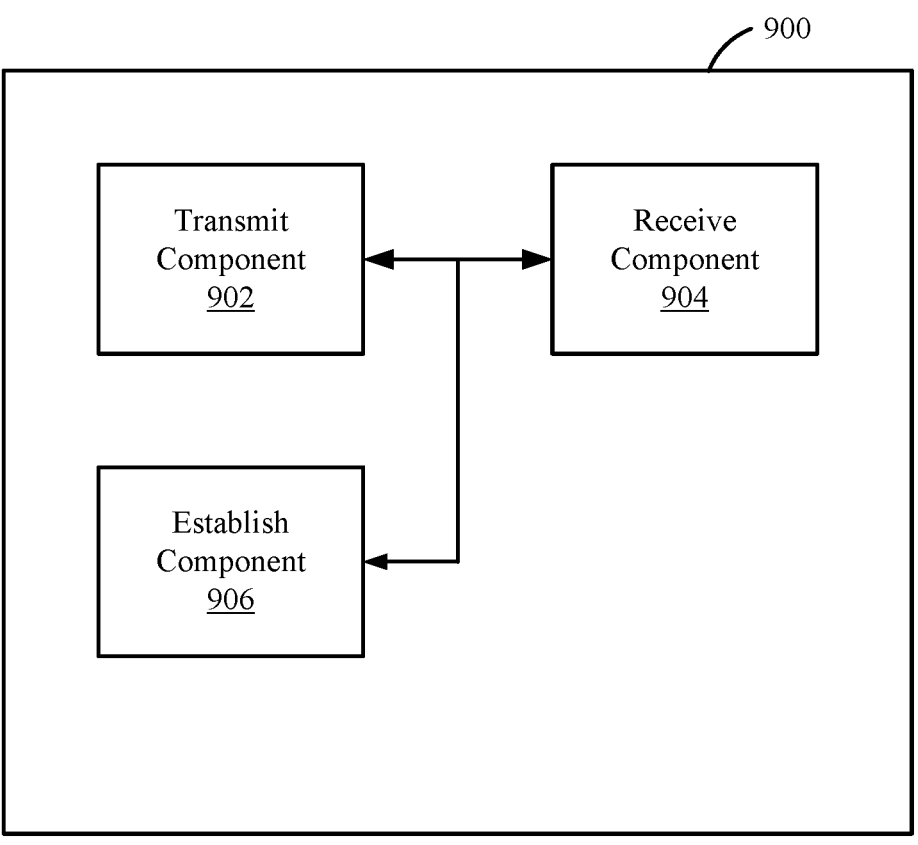
FIG. 9 shows a block diagram of an example wireless communication device that supports multi-AP association.

FIG. 9 shows a block diagram of an example wireless communication device 900 that supports multiple AP association according to some aspects of the present disclosure. In some examples, the wireless communication device 900 is configured or operable to perform the process 600 described with reference to FIG. 6. In various examples, the wireless communication device 900 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless communication device 900 can be a device for use in an MLE via an AP, such as AP 102 described with reference to FIG. 1. In some other examples, the wireless communication device 900 can be an AP that includes such a chip, SoC, chipset, package or device as well as multiple antennas. The wireless communication device 900 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 900 also includes or can be coupled with an application processor which may be further coupled with another memory. In some examples, the wireless communication device 900 further includes at least one external network interface that enables communication with a core network or backhaul network to gain access to external networks including the Internet.

The wireless communication device 900 includes a transmit component 902, a receive component 904, and an establish component 906. Portions of one or more of the components 902, 904, and 906 may be implemented at least in part in hardware or firmware. For example, the transmit component 902 and the receive component 904 may be implemented at least in part by a modem. In some examples, at least some of the components 902, 904, and 906 are implemented at least in part by a processor and as software stored in a memory. For example, portions of one or more of the components 902, 904, and 906 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the device 900). For example, a processing system of the device 900 may refer to a system including the various other components or sub-components of the device 900, such as the processor, or a transceiver, or a communications manager, or other components or combinations of components of the device 900. The processing system of the device 900 may interface with other components of the device 900 and may process information received from other components (such as inputs or signals) or output information to other components. For example, a chip or modem of the device 900 may include a processing system, a first interface to output information and a second interface to obtain information. In some implementations, the first interface may refer to an interface between the processing system of the chip or modem and a transmitter, such that the device 900 may transmit information output from the chip or modem. In some implementations, the second interface may refer to an interface between the processing system of the chip or modem and a receiver, such that the device 900 may obtain information or signal inputs, and the information may be passed to the processing system. A person having ordinary skill in the art will readily recognize that the first interface also may obtain information or signal inputs, and the second interface also may output information or signal outputs.

The transmit component 902 is capable of, configured to, or operable to transmit, via the transceiver, one or more communication parameters associated with each of the first AP and the second AP; transmit, to the second AP, an indication of the establishment of the active link between the first AP and the STA, wherein the indication is configured to notify the second AP whether to refrain from establishing another active link with the STA; and transmit, to the second AP, an indication of one or more of the STA's operational parameters and metrics.

The receive component 904 is capable of, configured to, or operable to receive, via the transceiver, a request from a station (STA) for association with the MLE and the first AP; and receive, from the STA, an indication that the idle link is activated as a second active link, wherein the MLE is configured to simultaneously maintain the first active link and the second active link until an indication to terminate the first active link is obtained from the STA or the second AP.

The establish component 906 is capable of, configured to, or operable to establish: an active link between the STA and the first AP, and an inactive link between the STA and the second AP.

Figure 10:
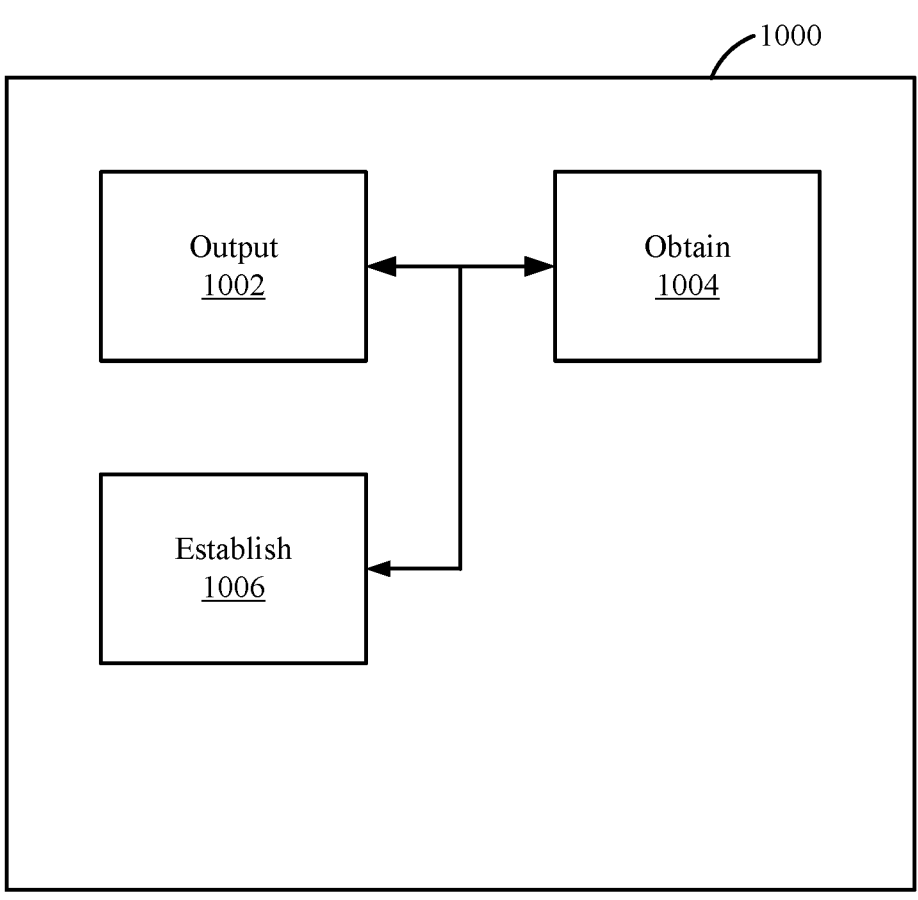
FIG. 10 shows a block diagram of an example wireless communication device that supports multi-AP association.

FIG. 10 shows a block diagram of an example wireless communication device 1000 that supports multiple AP association according to some aspects of the present disclosure. In some examples, the wireless communication device 1000 is configured or operable to perform the process 700 described with reference to FIG. 7. In various examples, the wireless communication device 1000 can be a chip, SoC, chipset, package or device that may include: one or more modems (such as, a Wi-Fi (IEEE 802.11) modem or a cellular modem such as 3GPP 4G LTE or 5G compliant modem), one or more processors, processing blocks or processing elements (collectively "the processor"); one or more radios (collectively "the radio"); and one or more memories or memory blocks (collectively "the memory").

In some examples, the wireless communication device 1000 can be a device for use in an AP, such as AP 102 described with reference to FIG. 1. The wireless communication device 1000 may include a chip, SoC, chipset, package or device as well as multiple antennas. The wireless communication device 1000 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 1000 also includes or can be coupled with an application processor which may be further coupled with another memory. In some examples, the wireless communication device 1000 further includes a user interface (UI) (such as a touchscreen or keypad) and a display, which may be integrated with the UI to form a touchscreen display. In some examples, the wireless communication device 1000 may further include one or more sensors such as, for example, one or more inertial sensors, accelerometers, temperature sensors, pressure sensors, or altitude sensors.

The wireless communication device 1000 includes an output component 1002, an obtain component 1004, and an establish component 1006. Portions of one or more of the components 1002, 1004, 1006 may be implemented at least in part in hardware or firmware. For example, the output component 1002 and the obtain component 1004 may be implemented at least in part by a modem. In some examples, at least some of the components 1002, 1004, 1006 are implemented at least in part by a processor and as software stored in a memory. For example, portions of one or more of the components 1002, 1004, 1006 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the device 1000). For example, a processing system of the device 1000 may refer to a system including the various other components or subcomponents of the device 1000, such as the processor, or a transceiver, or a communications manager, or other components or combinations of components of the device 1000. The processing system of the device 1000 may interface with other components of the device 1000, and may process information received from other components (such as inputs or signals) or output information to other components. For example, a chip or modem of the device 1000 may include a processing system, a first interface to output information and a second interface to obtain information. In some implementations, the first interface may refer to an interface between the processing system of the chip or modem and a transmitter, such that the device 1000 may transmit information output from the chip or modem. In some implementations, the second interface may refer to an interface between the processing system of the chip or modem and a receiver, such that the device 1000 may obtain information or signal inputs, and the information may be passed to the processing system. A person having ordinary skill in the art will readily recognize that the first interface also may obtain information or signal inputs, and the second interface also may output information or signal outputs.

The output component 1002 is capable of, configured to, or operable to output one or more communication parameters associated with each of the apparatus and an access point (AP), wherein both of the apparatus and the AP are members of a first multi-link entity (MLE); output, for transmission to the AP, an indication of the established active link between the apparatus and the STA, wherein the indication is configured to notify the AP to refrain from establishing another active link with the STA; and output, for transmission to the AP, an indication of one or more STA operational metrics.

The obtain component 1004 is capable of, configured to, or operable to obtain, from a station (STA), a request for association with the MLE and the apparatus; and obtain, from the STA or the AP, an indication that an inactive link between the STA and the AP has activated as a second active link, wherein the apparatus is configured to maintain the first active link until an indication to terminate the first active link is obtained from the STA or the AP.

The establish component 1006 is capable of, configured to, or operable to establish an active link between the STA and the apparatus.

Figure 11:
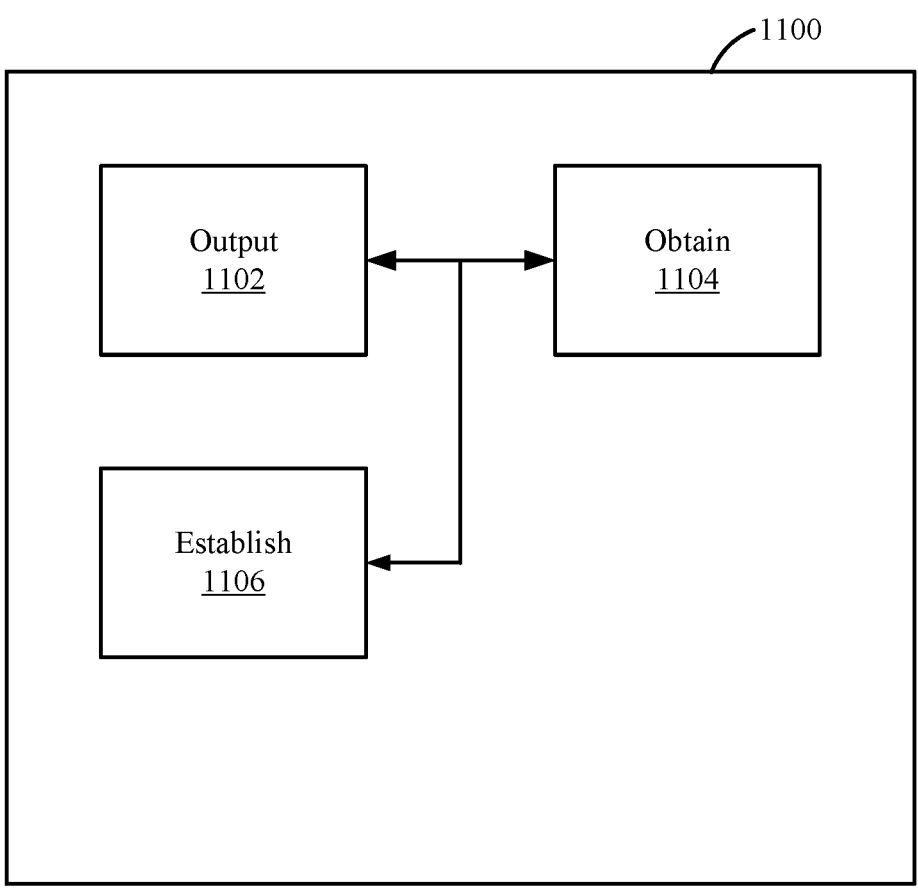
FIG. 11 shows a block diagram of an example wireless communication device that supports multi-AP association.

FIG. 11 shows a block diagram of an example wireless communication device 1100 that supports multiple AP association according to some aspects of the present disclosure. In some examples, the wireless communication device 1100 is configured or operable to perform the process 800 described with reference to FIG. 8. In various examples, the wireless communication device 1100 can be a chip, SoC, chipset, package or device that may include: one or more modems (such as, a Wi-Fi (IEEE 802.11) modem or a cellular modem such as 3GPP 4G LTE or 5G compliant modem), one or more processors, processing blocks or processing elements (collectively "the processor"); one or more radios (collectively "the radio"); and one or more memories or memory blocks (collectively "the memory").

In some examples, the wireless communication device 1100 can be a device for use in a STA, such as STA 104 described with reference to FIG. 1. In some other examples, the wireless communication device 1100 can be a STA that includes such a chip, SoC, chipset, package or device as well as multiple antennas. The wireless communication device 1100 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 1100 also includes or can be coupled with an application processor which may be further coupled with another memory. In some examples, the wireless communication device 1100 further includes a user interface (UI) (such as a touchscreen or keypad) and a display, which may be integrated with the UI to form a touchscreen display. In some examples, the wireless communication device 1100 may further include one or more sensors such as, for example, one or more inertial sensors, accelerometers, temperature sensors, pressure sensors, or altitude sensors.

The wireless communication device 1100 includes an output component 1102, an obtain component 1104, and an establish component 1106. Portions of one or more of the components 1102, 1104, 1106 may be implemented at least in part in hardware or firmware. For example, the output component 1102 and the obtain component 1104 may be implemented at least in part by a modem. In some examples, at least some of the components 1102, 1104, 1106 are implemented at least in part by a processor and as software stored in a memory. For example, portions of one or more of the components 1102, 1104, 1106 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the device 1100). For example, a processing system of the device 1100 may refer to a system including the various other components or subcomponents of the device 1100, such as the processor, or a transceiver, or a communications manager, or other components or combinations of components of the device 1100. The processing system of the device 1100 may interface with other components of the device 1100, and may process information received from other components (such as inputs or signals) or output information to other components. For example, a chip or modem of the device 1100 may include a processing system, a first interface to output information and a second interface to obtain information. In some implementations, the first interface may refer to an interface between the processing system of the chip or modem and a transmitter, such that the device 1100 may transmit information output from the chip or modem. In some implementations, the second interface may refer to an interface between the processing system of the chip or modem and a receiver, such that the device 1100 may obtain information or signal inputs, and the information may be passed to the processing system. A person having ordinary skill in the art will readily recognize that the first interface also may obtain information or signal inputs, and the second interface also may output information or signal outputs.

The output component 1102 is capable of, configured to, or operable to output, for transmission to the first AP, a request for association with the first AP and the MLE; output, for transmission to the second AP, a request to activate the inactive link as a second active link, wherein the apparatus is configured to simultaneously maintain the first active link and the second active; output, for transmission to the first AP, an indication to terminate the first active link; output, for transmission to the second AP, an indication of the established active link between the apparatus and the first AP, wherein the indication is configured to notify the second AP to refrain from establishing another active link with the STA; and output, for transmission to the first AP, an indication of one or more STA operational metrics.

The obtain component 1104 is capable of, configured to, or operable to obtain, from a first access point (AP) of a multi-link entity (MLE), one or more communication parameters associated with each of the first AP and a second AP of the MLE.

The establish component 1106 is capable of, configured to, or operable to establish: an active link between the apparatus and the first AP, and an inactive link between the apparatus and the second AP.

Figure 12:
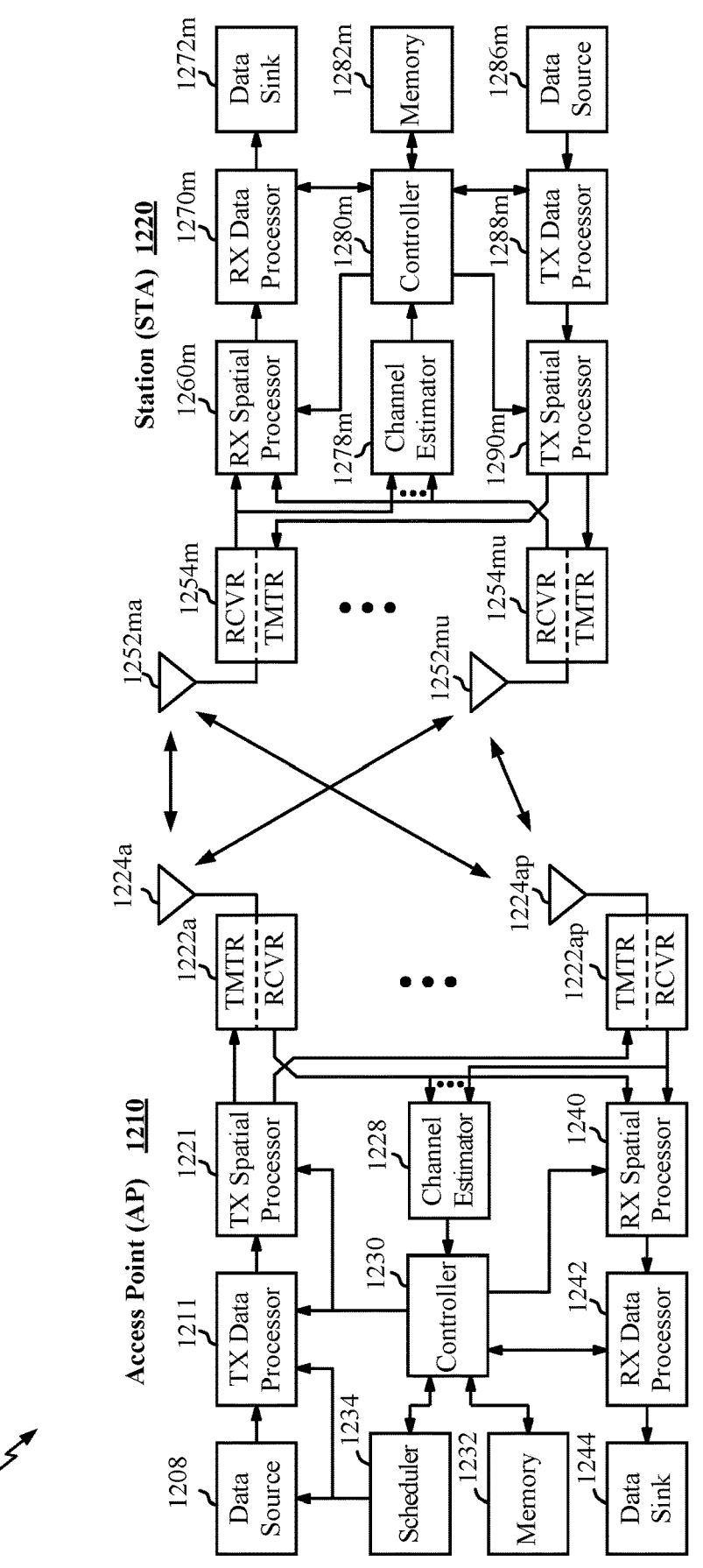
FIG. 12 shows a conceptual hardware component view of an AP and an STA.

FIG. 12 illustrates a block diagram 1200 of an STA 1220 and an AP 1210, which may be used to implement aspects of the present disclosure. For example, antennas 1224 and processors 1211, 1221, 1230, 1240, 1242 of the AP 1210 and/or antennas 1252 and processors 1260, 1270, 1280, 1288, 1290 of the STA 1220 may be used to perform the various techniques and methods described herein, such as the operations depicted in FIGS. 3-8.

The AP 1210 is equipped with antennas 1224a through 1224t. The STA 1220 is equipped with antennas 1252ma through 1252mu. The AP 1210 is a transmitting entity for the downlink and a receiving entity for the uplink. The STA 1220 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink at the STA 1220, a TX data processor 1288m receives traffic data from a data source 1286m and control data from a controller 1280m. TX data processor 1288m processes (e.g., encodes, interleaves, and modulates) the traffic data for the STA based on the coding and modulation schemes associated with the rate selected for the STA and provides a data symbol stream. A TX spatial processor 1290m performs spatial processing on the data symbol stream and provides transmit symbol streams for the antennas. Each transmitter unit (TMTR) 1254m-1254mu receives and processes (e.g., converts to analog, amplifies, filters, and frequency upconverts) a respective transmit symbol stream to generate an uplink signal. The transmitter units 1254m provide uplink signals for transmission from antennas

1252m to the AP. The AP 1210 may include a memory 1232, and the STA 1220 may include a memory 1282m.

$N_{up}$ STAs may be scheduled for simultaneous transmission on the uplink. Each of these STAs may perform spatial processing on its data symbol stream and transmits its set of transmit symbol streams on the uplink to the AP.

At the AP 1210, antennas 1224a through 1224ap receive the uplink signals from all $N_{up}$ STAs transmitting on the uplink. Each antenna 1224 provides a received signal to a respective receiver unit (RCVR) 1222a-1222ap. Each receiver unit 1222 performs processing complementary to that performed by transmitter unit 1254 and provides a received symbol stream. An RX spatial processor 1240 performs receiver spatial processing on the received symbol streams from receiver units 1222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 1242 processes (e.g., demodulates, deinterleaves, and decodes) each recovered uplink data symbol stream in accordance with the rate used for that stream to obtain decoded data. The decoded data for each user terminal may be provided to a data sink 1244 for storage and/or a controller 1230 for further processing.

On the downlink, at AP 1210, a TX data processor 1211 receives traffic data from a data source 1208 for $N_{dn}$ user terminals scheduled for downlink transmission, control data from a controller 1230, and possibly other data from a scheduler 1234. The various types of data may be sent on different transport channels. TX data processor 1211 processes (e.g., encodes, interleaves, and modulates) the traffic data for each user terminal based on the rate selected for that STA. TX data processor 1211 provides $N_{dn}$ downlink data symbol streams for the $N_{dn}$ STAs. A TX spatial processor 1221 performs spatial processing (such as a precoding or beamforming, as described in the present disclosure) on the $N_{dn}$ downlink data symbol streams, and provides transmit symbol streams for the antennas. Each transmitter unit 1222 receives and processes a respective transmit symbol stream to generate a downlink signal. The transmitter units 1222 providing downlink signals for transmission from antennas 1224 to the STA.

At the STA 1220, antennas 1252m receive the downlink signals from the AP 1210. Each receiver unit 1254m processes a received signal from an associated antenna 1252m and provides a received symbol stream. An RX spatial processor 1260m performs receiver spatial processing on received symbol streams from receiver units 1254m and provides a recovered downlink data symbol stream for the STA 1220. The receiver spatial processing is performed in accordance with the CCMI, MMSE or some other technique. An RX data processor 1270m processes (e.g., demodulates, deinterleaves and decodes) the recovered downlink data symbol stream to obtain decoded data for the STA.

At the STA 1220, a channel estimator 1278m estimates the downlink channel response and provides downlink channel estimates, which may include channel gain estimates, SNR estimates, noise variance and so on. Similarly, a channel estimator 1228 of the AP 1210 estimates the uplink channel response and provides uplink channel estimates. Controller 1280m of the STA typically derives the spatial filter matrix for the STA based on the downlink channel response matrix $H_{dn,m}$ for that STA. Controller 1230 derives the spatial filter matrix for the access point based on the effective uplink channel response matrix $H_{up,eff}$. Controller 1280*m* of the STA may send feedback information (e.g., the downlink and/or uplink eigenvectors, eigenvalues, SNR estimates, and so on) to the AP. Controllers 1230 and 1280*m* also control the operation of various processing units at the AP 1210 and the STA 1220, respectively.

Additional Considerations

Means for receiving or means for obtaining may include a receiver, such as one or more of the receive spatial processor 1240, receive data processor 1242, receiver unit 1222, and antenna 1224 of the AP 1210 or one or more of the receive spatial processor 1260*m*, receive data processor 1270*m*, receiver unit 1254*m*, and antenna 1252*m* of the STA 1220 illustrated in FIG. 12. Means for transmitting or means for outputting may include one or more of the transmit spatial processor 1221, transmit data processor 1211, transmit unit 1222, and antenna 1224 of the AP 1210, and one or more of the transmit spatial processor 1290*m*, transmit data processor 1288*m*, receiver unit 1254*m*, and antenna 1252*m* illustrated in FIG. 12.

Means for establishing may include a processing system, which may include one or more processors, such as the controller 1230 of the AP 1210 and the controller 1280*m* of the STA 1220 illustrated in FIG. 12.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "establishing" (or any variants thereof such as "establish") encompasses a wide variety of actions. For example, "establishing" may include forming, generating, setting up, initiating, creating, and the like. As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'"

or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

Example Aspects

Example 1 is a method of wireless communication performed by a multi-link entity (MLE) being associated with a plurality of access points (APs) including a first AP and a second AP configured for wireless communication, comprising: transmitting one or more communication parameters associated with each of the first AP and the second AP; receiving a request from a station (STA) for association with the MLE and the first AP; and establishing: an active link between the STA and the first AP, and an inactive link between the STA and the second AP.

Example 2 is the method of example 1, wherein the first AP is physically separated from the second AP.

Example 3 is the method of any of examples 1 and 2, wherein the one or more communication parameters are outputted for transmission via information signaling comprising one or more of a reduced neighbor report (RNR) IE, a neighbor report IE, a multi-link IE, and a multi-AP IE.

Example 4 is the method of example 3, wherein the information signaling is outputted for transmission via a management frame, and wherein the management frame is one of a beacon frame, a probe response frame, association response, basic service set (BSS) transition management, and a link reconfiguration frame.

Example 5 is the method of any of examples 1-4, wherein the one or more communication parameters comprise at least one of: a bandwidth of one or more of the first AP and the second AP, a transmit power limitation of one or more of the first AP and the second AP, an operating channel of one or more of the first AP and the second AP, a link identifier of one or more of the first AP and the second AP, and an indication that the first AP and the second AP are physically separated members of the MLE.

Example 6 is the method of any of examples 1-5, wherein the method further comprises transmitting, to the second AP, an indication of the establishment of the active link between the first AP and the STA, wherein the indication is configured to notify the second AP whether to refrain from establishing another active link with the STA.

Example 7 is the method of any of examples 1-6, wherein the method further comprises: transmitting, to the second AP, an indication of one or more operational parameters and metrics of the STA.

Example 8 is the method of example 7, wherein the operational parameters and metrics include one or more of a primary channel used by the STA, communication capabilities of the STA, an operational status of the STA, an association status between the STA and the MLE, and at least one STA credential.

Example 9 is the method of any of examples 1-8, wherein the active link is a first active link, and wherein the method further comprises: receiving, from the STA, an indication that the inactive link is activated as a second active link, wherein the MLE is configured to simultaneously maintain the first active link and the second active link until an indication to terminate the first active link is obtained from the STA or the second AP.

Example 10 is the method of any of examples 1-9, wherein the first AP comprises a transceiver, a memory, and one or more processors used to perform the method.

Example 11 is a method of wireless communication at an apparatus, comprising: outputting one or more communication parameters associated with each of the apparatus and an access point (AP), wherein both of the apparatus and the AP are members of a first multi-link entity (MLE); obtaining, from a station (STA), a request for association with the MLE and the apparatus; and establishing an active link between the STA and the apparatus.

Example 12 is the method of example 11, wherein the one or more communication parameters comprise at least one of: a bandwidth of the apparatus and the AP, a transmit power limitation of the apparatus and the AP, an operating channel of the apparatus and the AP, a link identifier of the apparatus and the AP, or an indication that the apparatus and the AP are physically separated members of the MLE.

Example 13 is the method of example 12, wherein the one or more communication parameters are outputted for transmission via information signaling comprising one or more of a reduced neighbor report (RNR) information element (IE), a neighbor report IE, a multi-link IE, and a multi-AP IE.

Example 14 is the method of example 13, wherein the information signaling is outputted for transmission via a management frame, and wherein the management frame is one of a beacon frame, a probe response frame, an association response frame, a basic service set (BSS) transition management frame, and a link reconfiguration frame.

Example 15 is the method of any of examples 11-14, wherein the active link is a first active link, and wherein the method further comprises: obtaining, from the STA or the AP, an indication that an inactive link between the STA and the AP has activated as a second active link, wherein the apparatus is configured to maintain the first active link until an indication to terminate the first active link is obtained from the STA or the AP.

Example 16 is the method of any of examples 11-15, further comprising: outputting, for transmission to the AP, an indication of the established active link between the apparatus and the STA, wherein the indication is configured to notify the AP to refrain from establishing another active link with the STA.

Example 17 is the method of any of examples 11-16, further comprising: outputting, for transmission to the AP, an indication of one or more operational parameters and metrics of the STA.

Example 18 is the method of example 17, wherein the STA operational parameters and metrics include one or more of a primary channel used by the STA, communication capabilities of the STA, an operational status of the STA, an association status between the STA and the apparatus, and at least one STA credential.

Example 19 is the method of any of examples 11-18, further comprising a transceiver configured to: transmit the one or more communication parameters associated with each of the apparatus and the AP; and receive the request for association, wherein the apparatus is configured as another AP.

Example 20 is a method of wireless communication at an apparatus, comprising: obtaining, from a first access point (AP) of a multi-link entity (MLE), one or more communication parameters associated with each of the first AP and a second AP of the MLE; outputting, for transmission to the first AP, a request for association with the first AP and the MLE; and establishing: an active link between the apparatus and the first AP, and an inactive link between the apparatus and the second AP.

Example 21 is the method of example 20, wherein the one or more communication parameters comprise at least one of: a bandwidth of the first AP and the second AP, a transmit power limitation of the first AP and the second AP, an operating channel of the first AP and the second AP, a link identifier of the first AP and the second AP, or an indication that the first AP and the second AP are physically separated members of the MLE.

Example 22 is the method of any of examples 20 and 21, wherein the one or more communication parameters are obtained via information signaling comprising one or more of a reduced neighbor report (RNR) information element (IE), a neighbor report IE, a multi-link IE, and a multi-AP IE.

Example 23 is the method of example 22, wherein the information signaling is obtained via a management frame, and wherein the management frame is one of a beacon frame, a probe response frame, an association response frame, a basic service set (BSS) transition management frame, and a link reconfiguration frame.

Example 24 is the method of any of examples 20-23, wherein the active link is a first active link, and wherein the method further comprises: outputting, for transmission to the second AP, a request to activate the inactive link as a second active link, wherein the apparatus is configured to simultaneously maintain the first active link and the second active.

Example 25 is the method of example 24, further comprising: outputting, for transmission to the first AP, an indication to terminate the first active link.

Example 26 is the method of any of examples 20-25, further comprising: outputting, for transmission to the second AP, an indication of the established active link between the apparatus and the first AP, wherein the indication is configured to notify the second AP to refrain from establishing another active link with the apparatus.

Example 27 is the method of any of examples 20-26, further comprising: outputting, for transmission to the first AP, an indication of one or more STA operational metrics.

Example 28 is the method of example 27, wherein the STA operational metrics include one or more of a primary channel used by the apparatus, communication capabilities of the apparatus, an operational status of the apparatus, an association status between the apparatus and the MLE, and at least one credential of the apparatus.

Example 29 is an MLE, comprising: a transceiver; a memory comprising instructions; and one or more processors configured to execute the instructions to cause the MLE to perform a method in accordance with any one of examples 1-10, wherein the transceiver is configured to: transmit, via the transceiver, one or more communication parameters associated with each of the first AP and the second AP; and receive, via the transceiver, a request from a station (STA) for association with the MLE and the first AP.

Example 30 is an apparatus, comprising: a transceiver; a memory comprising instructions; and one or more processors configured to execute the instructions and cause the apparatus to perform a method in accordance with any one of examples 11-19, wherein the transceiver is configured to: output one or more communication parameters associated with each of the apparatus and an access point (AP), wherein both of the apparatus and the AP are members of a first multi-link entity (MLE); and obtain, from a station (STA), a request for association with the MLE and the apparatus.

Example 31 is an apparats, comprising: a transceiver; a memory comprising instructions; and one or more processors configured to execute the instructions and cause the apparatus to perform a method in accordance with any one of examples 20-28, wherein the transceiver is configured to: obtain, from a first access point (AP) of a multi-link entity (MLE), one or more communication parameters associated with each of the first AP and a second AP of the MLE; and output, for transmission to the first AP, a request for association with the first AP and the MLE.

Example 32 is an apparatus for wireless communications, comprising means for performing a method in accordance with any one of examples 1-10.

Example 33 is an apparatus for wireless communications, comprising means for performing a method in accordance with any one of examples 11-19.

Example 34 is an apparatus for wireless communications, comprising means for performing a method in accordance with any one of examples 20-28.

Example 35 is a non-transitory computer-readable medium comprising instructions that, when executed by an apparatus, cause the apparatus to perform a method in accordance with any one of examples 1-10.

Example 36 is a non-transitory computer-readable medium comprising instructions that, when executed by an apparatus, cause the apparatus to perform a method in accordance with any one of examples 11-19.

Example 37 is a non-transitory computer-readable medium comprising instructions that, when executed by an apparatus, cause the apparatus to perform a method in accordance with any one of examples 20-28.

Example 38 is an apparatus for wireless communications, comprising: a memory comprising instructions; and one or more processors configured to execute the instructions to cause the apparatus to perform a method in accordance with any one of examples 1-10.

Example 38 is an apparatus for wireless communications, comprising: a memory comprising instructions; and one or more processors configured to execute the instructions to cause the apparatus to perform a method in accordance with any one of examples 11-19.

Example 39 is apparatus for wireless communications, comprising: a memory comprising instructions; and one or more processors configured to execute the instructions to cause the apparatus to perform a method in accordance with any one of examples 20-28.

What is claimed is:

1. A multi-link entity (MLE) being associated with a plurality of access points (APs) including a first AP and a second AP configured for wireless communication, comprising:
   at least one transceiver;
   at least one memory comprising instructions; and
   one or more processors configured to execute the instructions to cause the MLE to:
      transmit, via the at least one transceiver, one or more communication parameters associated with each of the first AP and the second AP;
      receive, via the at least one transceiver and a station (STA), a request to associate with the MLE and the first AP; and
      establish, via the at least one transceiver:
         an active link between the STA and the first AP, and
         an inactive link between the STA and the second AP.

2. The MLE of claim 1, wherein the first AP is physically separated from the second AP.

3. The MLE of claim 1, wherein the one or more communication parameters are transmitted via information signaling comprising one or more of a reduced neighbor report (RNR) IE, a neighbor report IE, a multi-link IE, and a multi-AP IE.

4. The MLE of claim 3, wherein the information signaling is transmitted via a management frame, and wherein the management frame is one of a beacon frame, a probe response frame, association response, basic service set (BSS) transition management, and a link reconfiguration frame.

5. The MLE of claim 1, wherein the one or more communication parameters comprise at least one of: a bandwidth of one or more of the first AP and the second AP, a transmit power limitation of one or more of the first AP and the second AP, an operating channel of one or more of the first AP and the second AP, a link identifier of one or more of the first AP and the second AP, or an indication that the first AP and the second AP are physically separated members of the MLE.

6. The MLE of claim 1, wherein the one or more processors are further configured to cause the MLE to:

transmit, via the at least one transceiver and to the second AP, an indication of the establishment of the active link between the first AP and the STA, wherein the indication is configured to notify the second AP whether to refrain from establishing another active link with the STA.

7. The MLE of claim 1, wherein the one or more processors are further configured to cause the MLE to:

transmit, via the at least one transceiver and to the second AP, an indication of one or more operational parameters and metrics of the STA.

8. The MLE of claim 7, wherein the operational parameters and metrics include one or more of a primary channel used by the STA, communication capabilities of the STA, an operational status of the STA, an association status between the STA and the MLE, and at least one STA credential.

9. The MLE of claim 1, wherein the active link is a first active link, and wherein the one or more processors are further configured to cause the MLE to:

receive, via the at least one transceiver and from the STA, an indication that the inactive link is activated as a second active link, wherein the MLE is configured to simultaneously maintain the first active link and the second active link until an indication to terminate the first active link is received, via the at least one transceiver, from the STA or the second AP.

10. The MLE of claim 1, wherein the first AP comprises the at least one transceiver, the at least one memory, and the one or more processors.

11. A first access point (AP), comprising:

at least one transceiver;

at least one memory comprising instructions; and one or more processors configured to execute the instructions and cause the first access point to:

transmit, via the at least one transceiver, one or more communication parameters associated with each of the first access point and a second AP, wherein both of the first access point and the second AP are members of a first multi-link entity (MLE);

receive, via the at least one transceiver and from a station (STA), a request to associate with the MLE and the first access point; and establish, via the at least one transceiver, an active link between the STA and the first access point.

12. The first access point of claim 11, wherein the one or more communication parameters comprise at least one of: a bandwidth of the first access point and the second AP, a transmit power limitation of the first access point and the second AP, an operating channel of the first access point and the second AP, a link identifier of the first access point and the second AP, or an indication that the first access point and the second AP are physically separated members of the MLE.

13. The first access point of claim 12, wherein the one or more communication parameters are transmitted via information signaling comprising one or more of a reduced neighbor report (RNR) information element (IE), a neighbor report IE, a multi-link IE, and a multi-AP IE.

14. The first access point of claim 13, wherein the information signaling is transmitted via a management frame, and wherein the management frame is one of a beacon frame, a probe response frame, an association response frame, a basic service set (BSS) transition management frame, and a link reconfiguration frame.

15. The first access point of claim 11, wherein the active link is a first active link, and wherein the one or more processors are further configured to cause the first access point to:

receive, from the STA or the second AP, an indication that an inactive link between the STA and the second AP has activated as a second active link, wherein the first access point is configured to maintain the first active link until an indication to terminate the first active link is received, via the at least one transceiver, from the STA or the second AP.

16. The first access point of claim 11, wherein the one or more processors are further configured to cause the first access point to:

transmit, via the at least one transceiver and to the second AP, an indication of the established active link between the first access point and the STA, wherein the indication is configured to notify the second AP to refrain from establishing another active link with the STA.

17. The first access point of claim 11, wherein the one or more processors are further configured to cause the first access point to:

transmit, via the at least one transceiver and to the second AP, an indication of one or more operational parameters and metrics of the STA.

18. The first access point of claim 17, wherein the STA operational parameters and metrics include one or more of a primary channel used by the STA, communication capabilities of the STA, an operational status of the STA, an association status between the STA and the first access point, and at least one STA credential.

19. A station, comprising:

at least one transceiver;

at least one memory comprising instructions; and one or more processors configured to execute the instructions to cause the station to:

receive, via the at least one transceiver and from a first access point (AP) of a multi-link entity (MLE), one or more communication parameters associated with each of the first AP and a second AP of the MLE;

transmit, via the at least one transceiver and to the first AP, a request to associate with the first AP and the MLE; and establish, via the at least one transceiver:

an active link between the station and the first AP, and an inactive link between the station and the second AP.

20. The station of claim 19, wherein the one or more communication parameters comprise at least one of: a bandwidth of the first AP and the second AP, a transmit power limitation of the first AP and the second AP, an operating channel of the first AP and the second AP, a link identifier of the first AP and the second AP, or an indication that the first AP and the second AP are physically separated members of the MLE.

21. The station of claim 19, wherein the one or more communication parameters are received via information signaling comprising one or more of a reduced neighbor report (RNR) information element (IE), a neighbor report IE, a multi-link IE, and a multi-AP IE.

22. The station of claim 21, wherein the information signaling is received via a management frame, and wherein the management frame is one of a beacon frame, a probe response frame, an association response frame, a basic service set (BSS) transition management frame, and a link reconfiguration frame.

23. The station of claim 19, wherein the active link is a first active link, and wherein the one or more processors are further configured to cause the station to:

transmit, via the at least one transceiver and to the second AP, a request to activate the inactive link as a second active link, wherein the station is configured to simultaneously maintain the first active link and the second active.

24. The station of claim 23, wherein the one or more processors are further configured to cause the station to:

transmit, via the at least one transceiver and to the first AP, an indication to terminate the first active link.

25. The station of claim 19, wherein the one or more processors are further configured to cause the station to:

transmit, via the at least one transceiver and to the second AP, an indication of the established active link between the station and the first AP, wherein the indication is configured to notify the second AP to refrain from establishing another active link with the station.

26. The station of claim 19, wherein the one or more processors are further configured to cause the station to:

transmit, via the at least one transceiver and to the first AP, an indication of one or more STA operational metrics.

27. The station of claim 26, wherein the STA operational metrics include one or more of a primary channel used by the station, communication capabilities of the station, an operational status of the station, an association status between the station and the MLE, and at least one credential of the station.

\* \* \* \* \*